United States Patent [19]

Kato et al.

[11] Patent Number: 5,258,831
[45] Date of Patent: Nov. 2, 1993

[54] IMAGE READING DEVICE CAPABLE OF COLOR DISCRIMINATION

[75] Inventors: Akio Kato; Hideyuki Kanbayashi, both of Toyohashi; Kaoru Tada, Aichi; Katsuaki Tajima, Toyokawa, all of Japan

[73] Assignee: Minolta Camera Kabushiki Kaisha, Osaka, Japan

[21] Appl. No.: 745,419

[22] Filed: Aug. 15, 1991

[30] Foreign Application Priority Data

Aug. 20, 1990 [JP] Japan .................................. 2-219542
Aug. 20, 1990 [JP] Japan .................................. 2-219543

[51] Int. Cl.⁵ .......................... H04N 1/46; H04N 1/40
[52] U.S. Cl. ...................................... 358/500; 358/455; 358/527
[58] Field of Search ..................... 358/75, 80, 78, 462, 358/79, 455, 461; 395/109

[56] References Cited

U.S. PATENT DOCUMENTS 4,553,160 12/1985 Yamamoto et al. ................... 358/75
4,718,040 1/1988 Ayata et al. ........................... 358/75

Primary Examiner—Edward L. Coles, Sr.
Assistant Examiner—Scott A. Rogers
Attorney, Agent, or Firm—Burns, Doane, Swecker & Mathis

[57] ABSTRACT

In an image reading device for reading an image of an original document and outputting a density data indicating the density a color discriminating data indicating the color of each picture element, the image reading device comprising: an image reading section for reading the image with at least two color characteristics and outputting a first image data used to generate the density data and a second image data used to generate the color discriminating data, the second image data having a lower picture element density or a fewer number of density level than the first image data; and a color discriminating section for outputting the color discriminating data on the basis of the second image data.

40 Claims, 22 Drawing Sheets

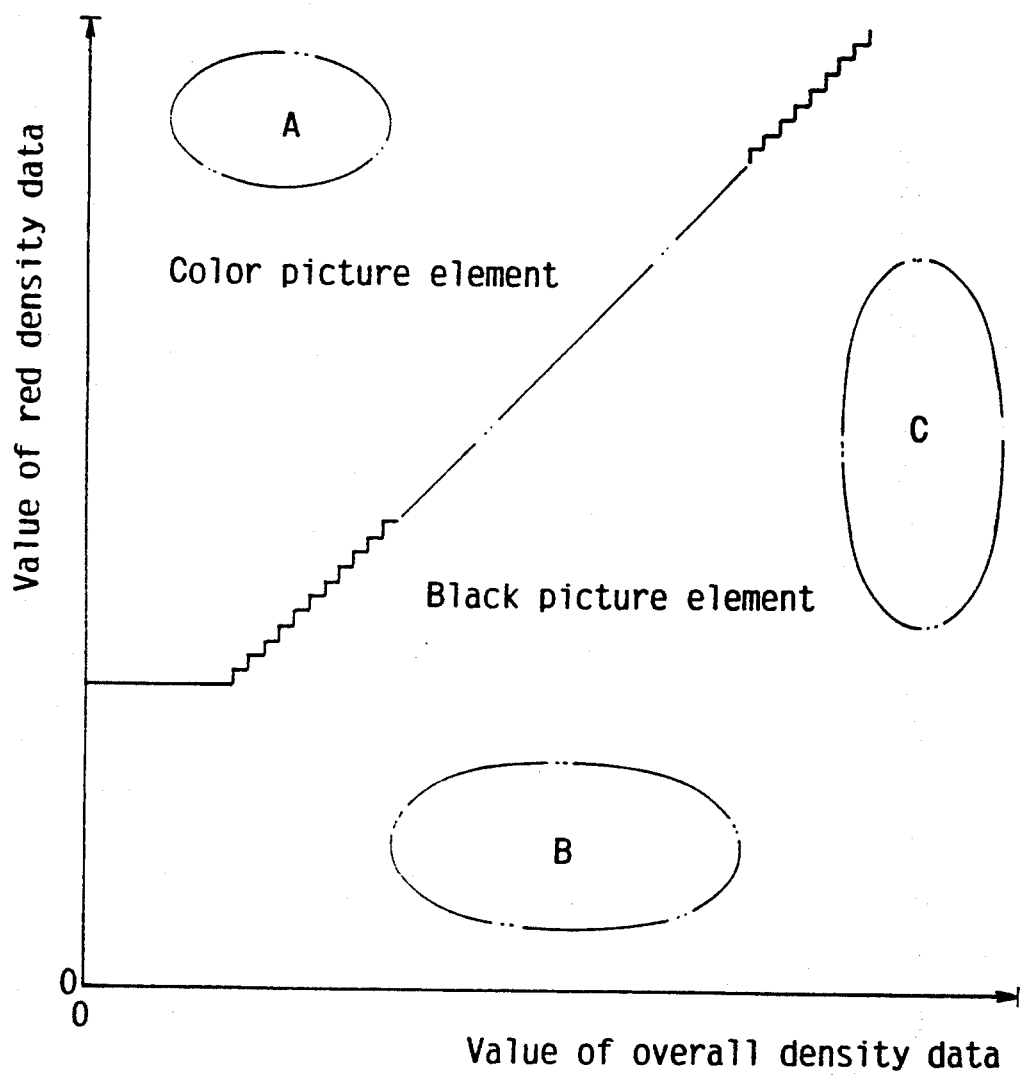

Color discrimination map

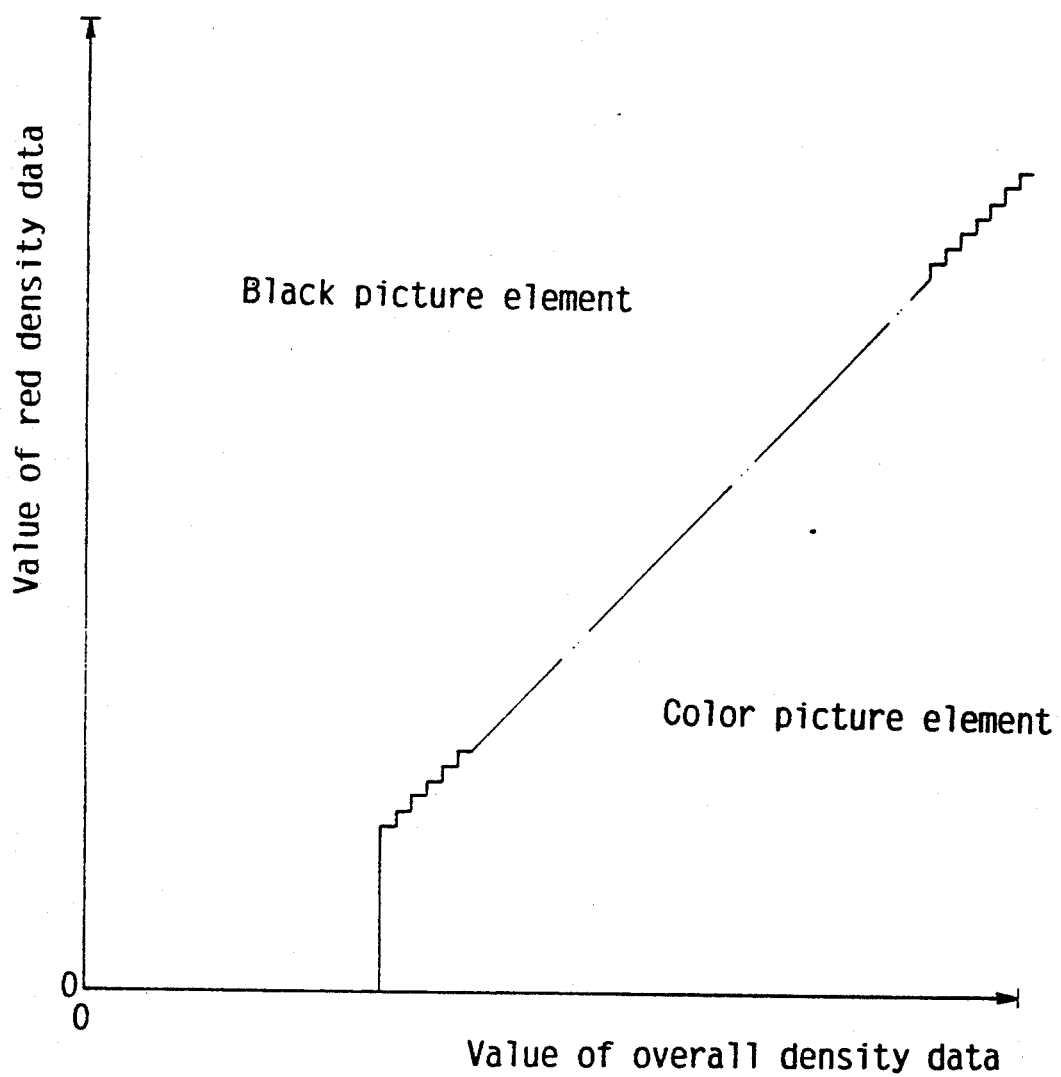

Fig. 8

Color discrimination map

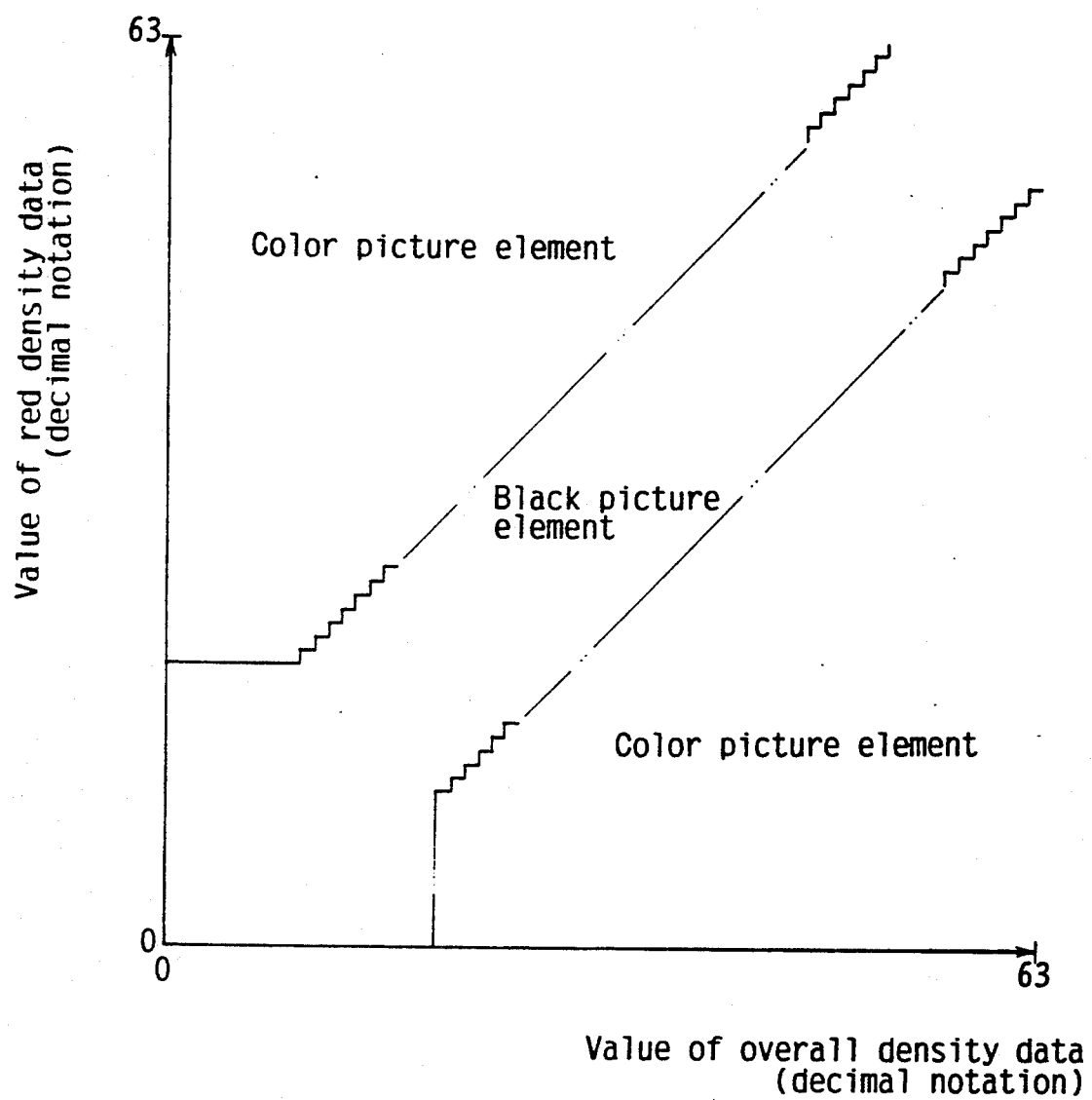

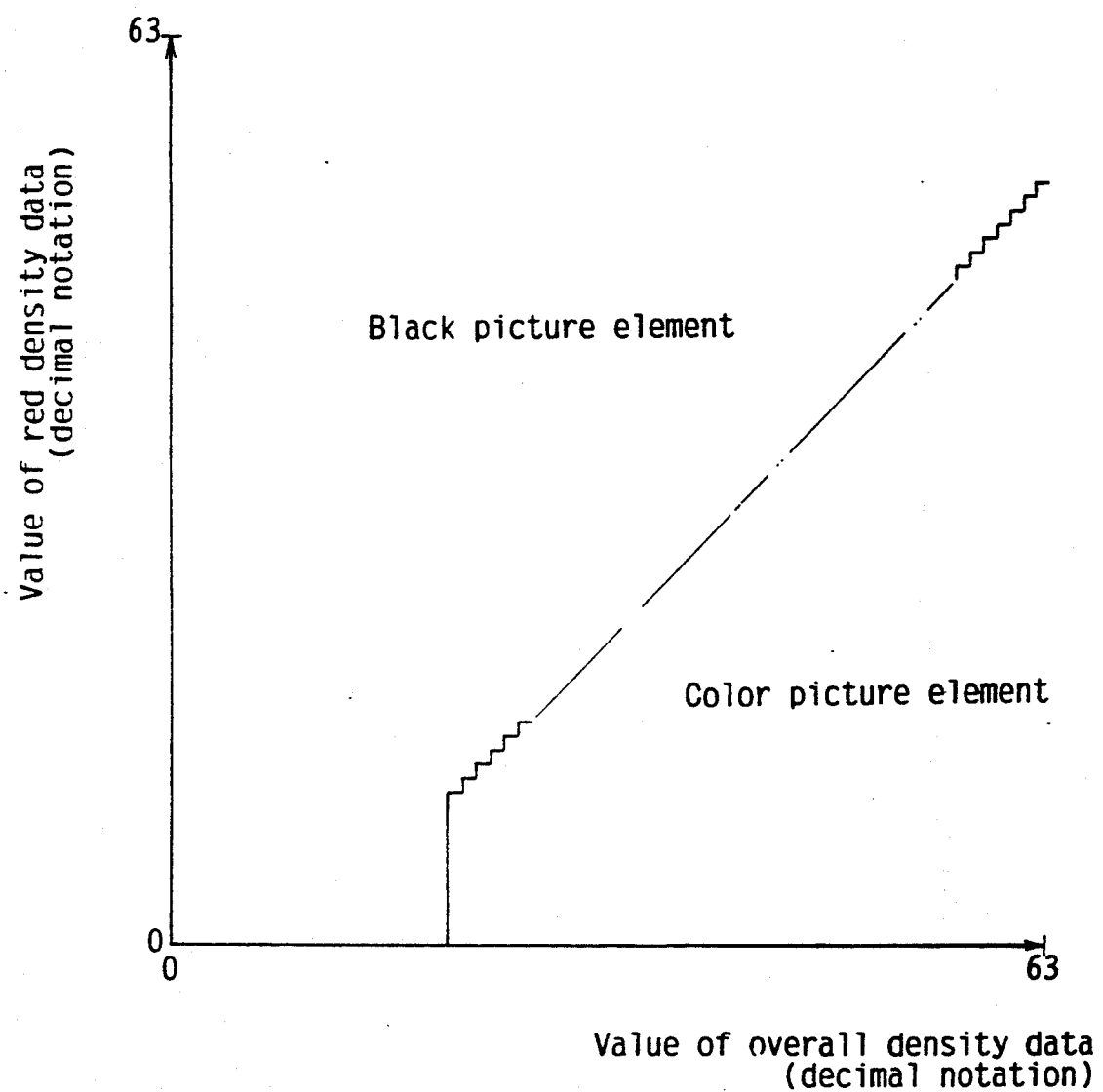

IMAGE READING DEVICE CAPABLE OF COLOR DISCRIMINATION

BACKGROUND OF THE INVENTION

1. Field of the Invention

The present invention relates to an image reading device employed in an image scanner, a copier or the like for reading an image data of an original document and outputting a density data and a color discriminating data for each picture element.

2. Description of the Related Art

A conventional image reading device for reading an original image with at least two color characteristics and outputting a density data indicating the density and a color discriminating data indicating the color of each picture element has been disclosed in U.S. Pat. No. 4,553,160.

In this type of image reading device, color of each picture element is discriminated on the basis of a density data concerning all the color components (overall density data) and a density data concerning a specified color, for example, red (red density data). The overall density is detected by using, for example, a CCD sensor, while the red density is detected by using a red light transmitting filter and another CCD sensor having the same detecting element density as the above CCD sensor.

More specifically, as shown in FIG. 1, the overall density data and the red density data having the same number of bits (the same number of density level) as the overall density data are inputted as an address into a MAP-ROM 92 of a color discriminating section 91. A data corresponding to the address is read as a color discriminating data out of a color discriminating map which is previously stored in the MAP-ROM 92.

In the above device, however, since amount of the data to be processed in a color discriminating circuit and other circuits is large, elements operable at high speeds are required. This causes the circuit construction to be complicated. In addition, where a delay element or a frame memory is used to synchronize the overall density data and red density data, the delay element or the frame memory is required to be large in memory capacity.

Further, since the overall density data and red density data have the same number of density level, the MAP-ROM 92 is required to have a large memory capacity and the number of lines between the CCD sensors and the MAP-ROM 92 is increased. Such a large number of density level of the red density data also requires the memory capacity of the delay memory to be large.

As apparent from the above, the conventional image reading device has problems of complicated construction, large size and high cost.

SUMMARY OF THE INVENTION

An object of the present invention, therefore, is to provide an image reading device having a simple construction and realizing a low manufacturing cost.

The above object is fulfilled by an image reading device comprising a photoelectric transferring section for generating an electric signal corresponding to the density of an image of an original document; a first density data outputting section for outputting, in accordance with the signal generated by the photoelectric transferring section, a first density data indicating the density of the image and having a first picture element density; a second density data outputting section for outputting, in accordance with the signal generated by the photoelectric transferring section, a second density data having a second picture element density which is lower than the first picture element density; and a color discriminating section for discriminating the color of the image on the basis of the second density data.

The above object is also fulfilled by an image reading device comprising a first photoelectric transferring section for generating a first electric signal corresponding to the density of an image of an original document and having a first picture element density; a second photoelectric transferring section for generating a second electric signal corresponding to the density of the image of the original document and having a second picture element density lower than the first picture element density; a first density data outputting section for, in response to the first electric signal, outputting a first density data indicating the density of the image; a second density data outputting section for, in response to the second electric signal, outputting a second density data; and a color discriminating section for discriminating the color of the image on the basis of at least the second density data.

The above object is also fulfilled by an image reading device comprising a photoelectric transferring section for generating an electric signal corresponding to the density of an image of an original document, a first density data outputting section for, in accordance with the electric signal generated by the photoelectric transferring section, outputting a first density data indicating the density of the image and having a first number of density level; a second density data outputting section for, in accordance with the electric signal generated by the photoelectric transferring section, outputting a second density data having a second number of density level fewer than the first number; and a color discriminating section for discriminating the color of the image on the basis of the second density data.

According to the above construction, the color discriminating section executes color discrimination on the basis of the second density data having a lower density or a fewer number of density level than the first density data. Therefore, constructions of the color discriminating section and other circuits are simplified and elements which are low in cost can be employed.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIGS. 6a through 6c are explanatory views showing examples of a color discriminating map, FIG. 8 is an explanatory view showing an example of an original image, FIGS. 18a through 18c are explanatory views showing examples of a color discriminating map.

DESCRIPTION OF THE PREFERRED EMBODIMENTS

First Embodiment

A first embodiment of the present invention will be described hereinafter, referring to FIGS. 2 through 8.

Figure 1:
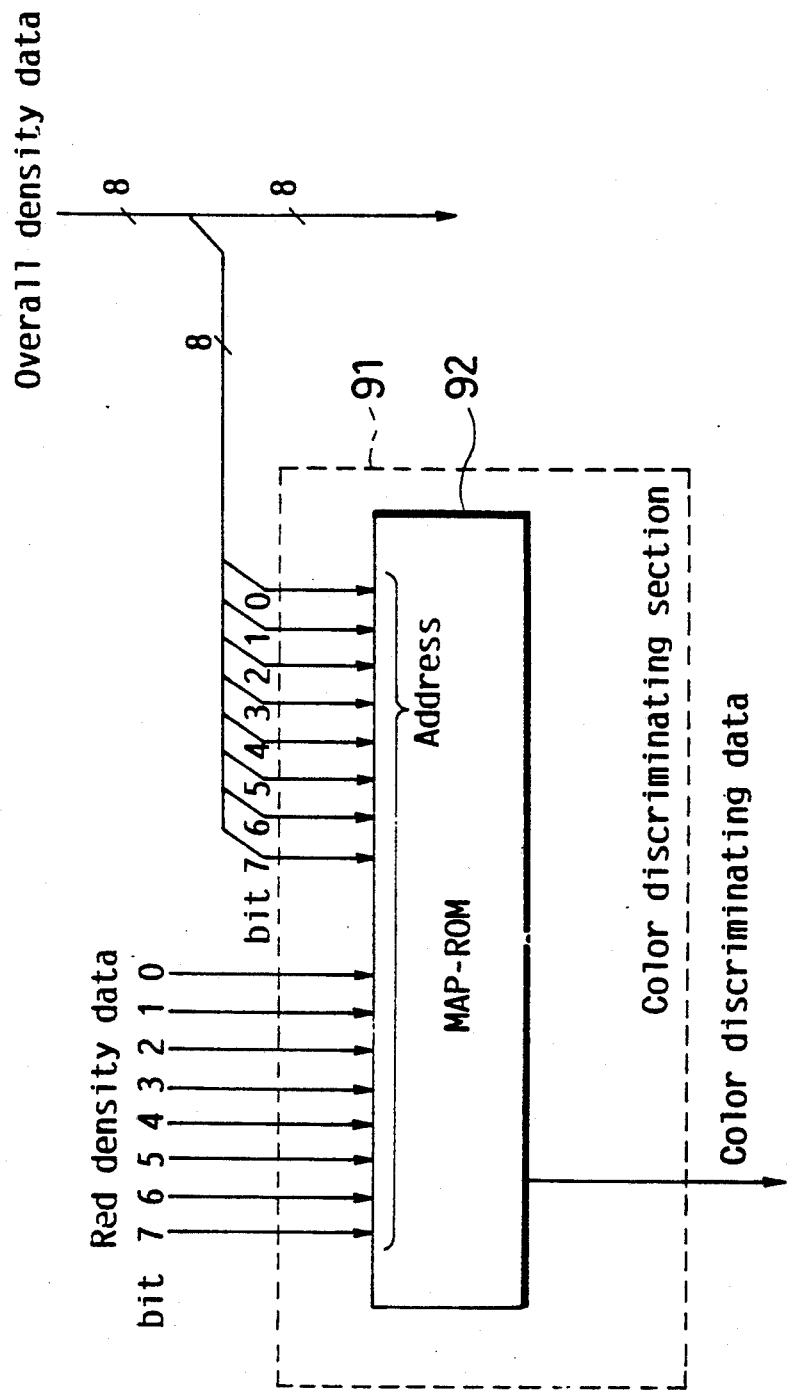
FIG. 1 is a block diagram showing the construction of a color discriminating section of a conventional image reading device.
Figure 2:
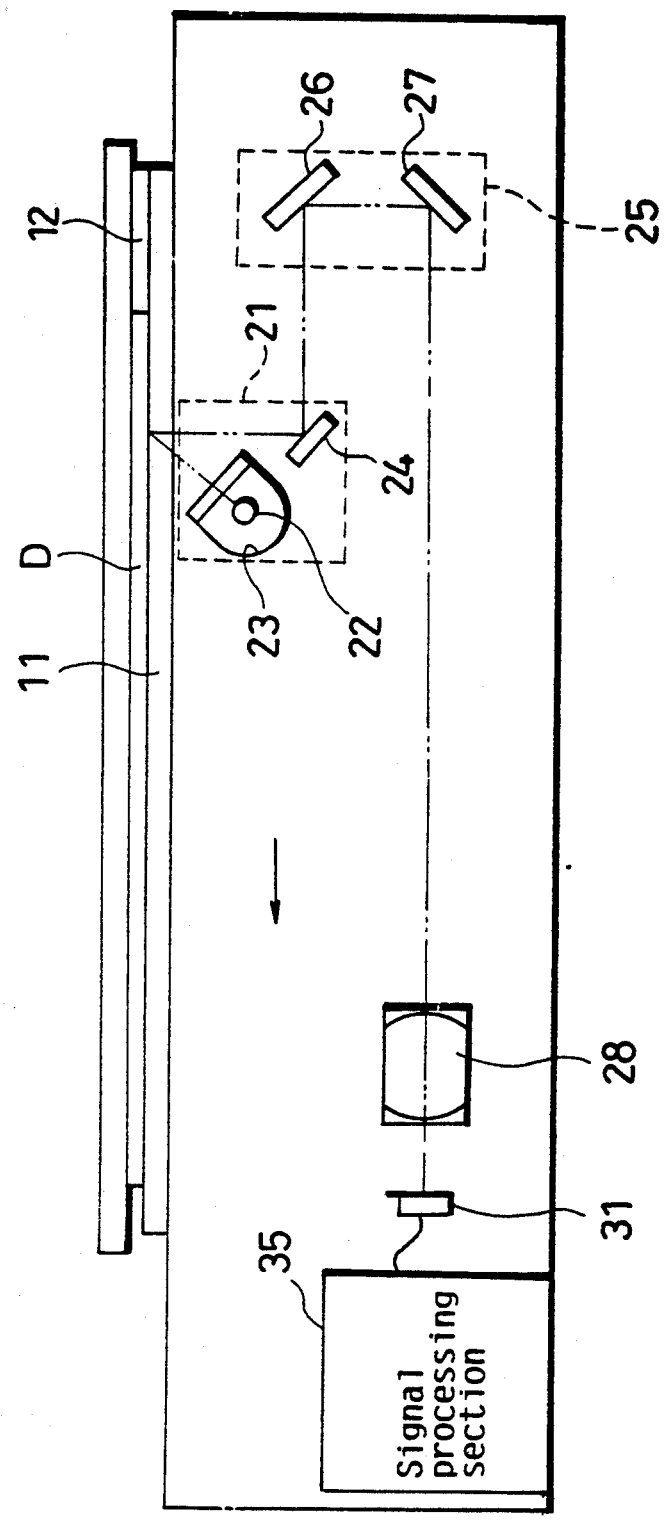
FIG. 2 is a front sectional view showing the construction of an image reading device according to a first embodiment of the present invention.

In FIG. 2, D is an original document, 11 is a document glass table, 12 is a shading compensation reflecting plate, 21 is a first slider unit comprising an exposure lamp 22, a lamp light reflecting mirror 23 and a first mirror 24, 25 is a second slider unit comprising a second mirror 26 and a third mirror 27, 28 is an optical lens, 31 is a CCD line sensor unit and 35 is a signal processing section.

Figure 3:
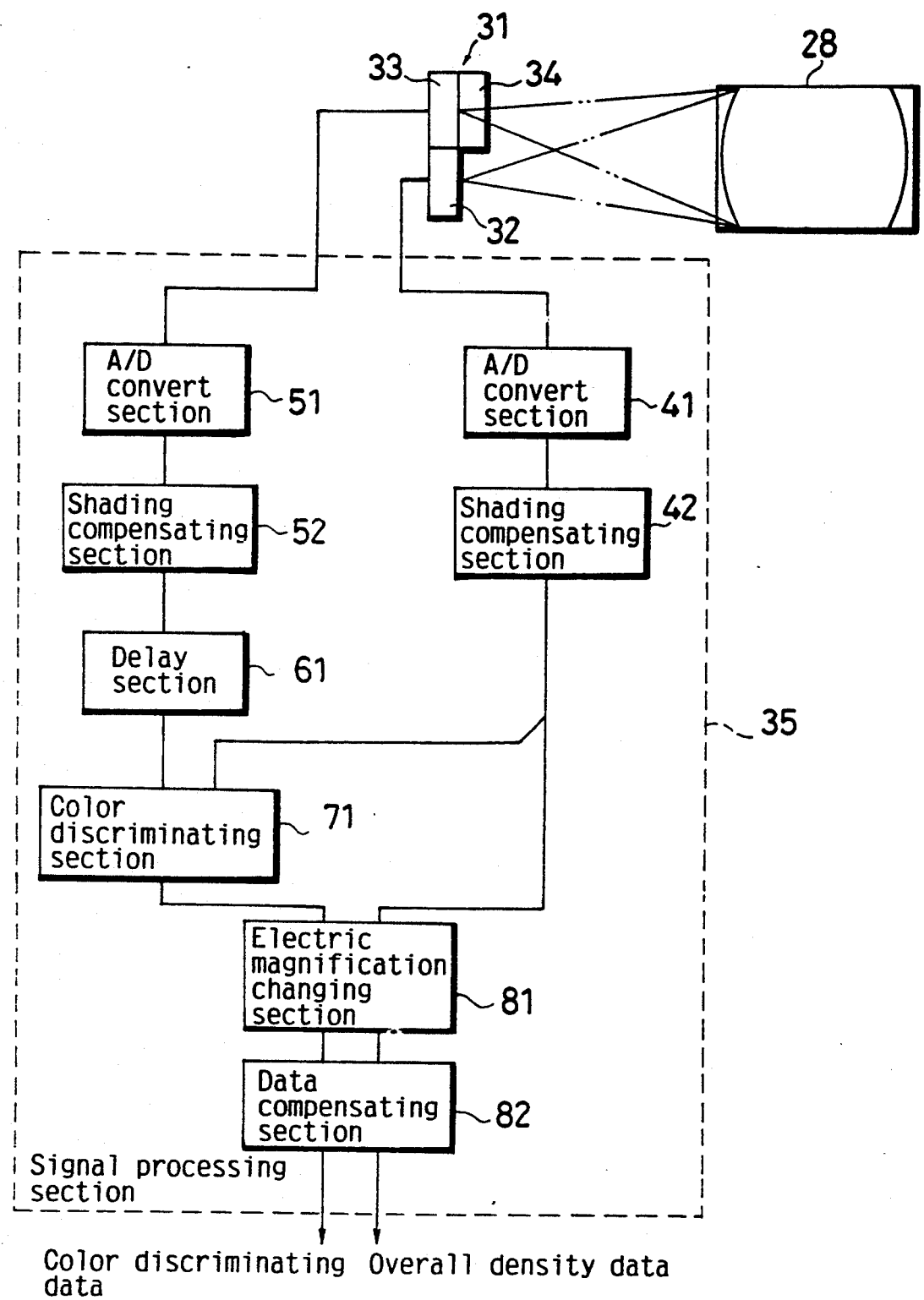
FIG. 3 is a block diagram showing the construction of a signal processing section.

As shown in FIG. 3, the CCD line sensor unit 31 comprises a first CCD line sensor 32, a second CCD line sensor 33 and a red light transmitting filter 34. The signal processing section 35 comprises A/D convert sections 41 and 51, shading compensating sections 42 and 52, a delay section 61, a color discriminating section 71, an electric magnification changing section 81 and a data compensating section 82.

The first slider unit 21 is driven by a driving unit (not shown) to move in a direction indicated by an arrow in FIG. 2 (referred to as a sub scanning direction, hereinafter). The second slider unit 25 is also moved in the sub scanning direction in synchronism with the first slider unit 21 at half the speed thereof, whereby a distance between the original document D and the CCD line sensor unit 31 is kept constant. The optical lens 28 focuses the light reflected on the original document D onto light receiving surfaces of the CCD line sensors 32 and 33, thereby forming an image corresponding to the original image thereon.

Each of the CCD line sensors 32 and 33 consists of a plurality of light detecting elements arranged in a direction perpendicular to the sub scanning direction (referred to as a main scanning direction, hereinafter). The red light transmitting filter 34 is provided to the right of the second CCD line sensor 33, whereby the second CCD line sensor 33 detects the density of a red component of each picture element whereas the first CCD line sensor 32 detects the density of all the color components.

Since the light reflected on the same line of the document D is received by the first CCD line sensor 32 a specified time (referred to as an image-forming time lag, hereinafter) later than it is received by the second CCD line sensor 33, a line clock signal and a reference clock signal (neither shown) are inputted to the first CCD line sensor 32 when a time corresponding to the above image-forming time lag has passed since a line clock signal and a reference clock signal are inputted to the second CCD line sensor 33. The image-forming time lag depends on a distance between the second CCD line sensor 33 and the first CCD line sensor 32 and a sub scanning speed of the first slider unit 21. That is, the time lag between the time when the signals are inputted to the second CCD line sensor 33 and the time when the signals are inputted to the first CCD line sensor 32 is varied with a reading magnification.

Each of the A/D convert sections 41 and 51 has a sample hold circuit and an A/D converter (not shown). The sections 41 and 51 respectively amplify analog signals outputted from the first and second CCD line sensors 32 and 33 and convert the amplified analog signals into, for example, 8-bit digital signals corresponding to dynamic ranges determined by the values of A/D reference voltages (not shown). Then, the digital signals are outputted respectively as an overall density data and a red density data of each picture element.

The shading compensating sections 42 and 52 respectively compensate for the overall density data and the red density data on the basis of signals which are outputted from the first and second CCD line sensors 32 and 33 when the shading compensation reflecting plate 12 is exposed. As a result, nonuniformity of the light amount of the exposure lamp 22 and dispersion of sensitivities of the sensors 32 and 33 are compensated for. The sections 42 and 52 can be controlled not to operate when the outputs from the CCD line sensors 32 and 33 are being adjusted.

The overall density data outputted from the shading compensating section 42 is inputted to the color discriminating section 71 on one hand and inputted to the the electric magnification changing section 81 on the other hand. The red density data outputted from the shading compensating section 52 is inputted to the color discriminating section 71 through the delay section 61.

Figure 4:
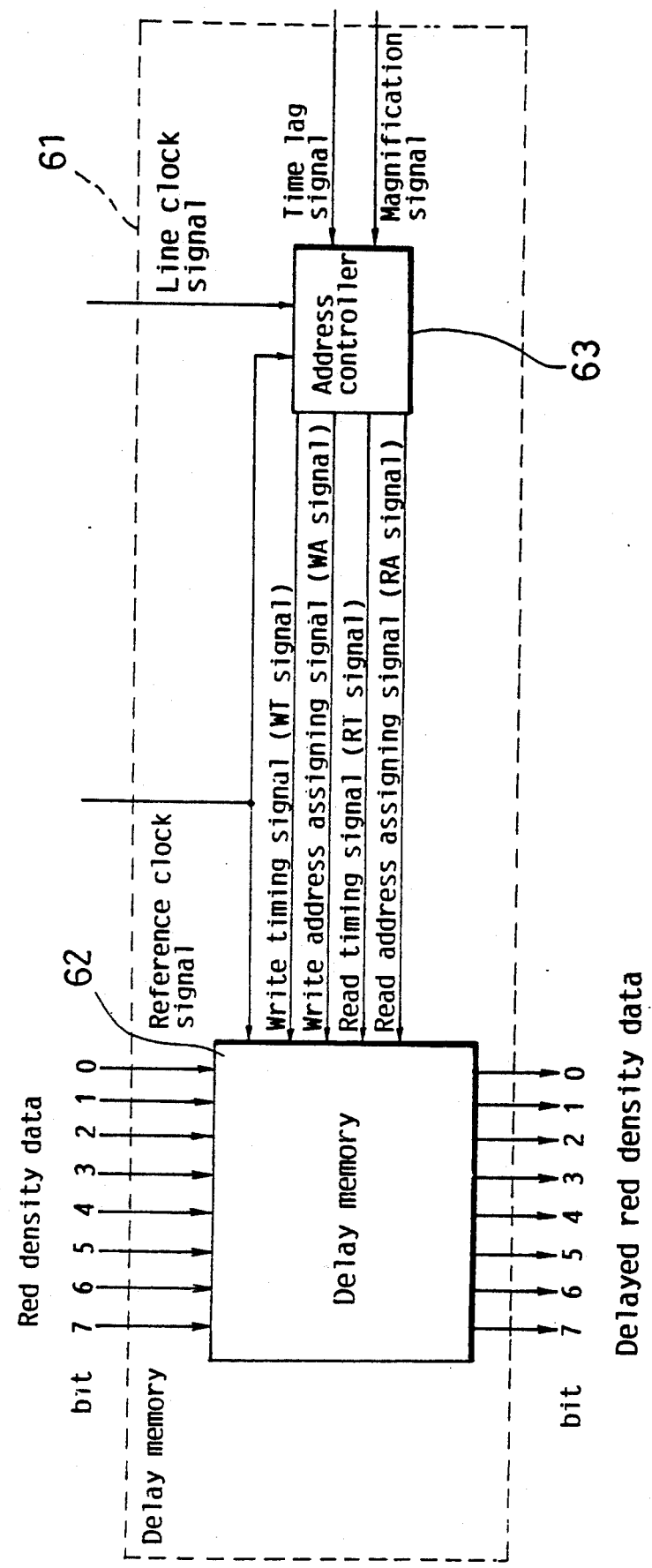
FIG. 4 is a block diagram showing the construction of a delay section.

As shown in FIG. 4, the delay section 61 comprises a delay memory 62 and an address controller 63. Image slippage between the CCD line sensors 32 and 33 in the sub scanning direction due to the image-forming time lag is adjusted by delaying the red density data. The address controller 63 reduces the red density data when the original image is to be read in enlargement as will be described later. Image slippage in the main scanning direction due to assembly error of the sensors 32 and 33 or the like is adjusted by changing the timing at which the reference clock signals are generated.

Figure 5:
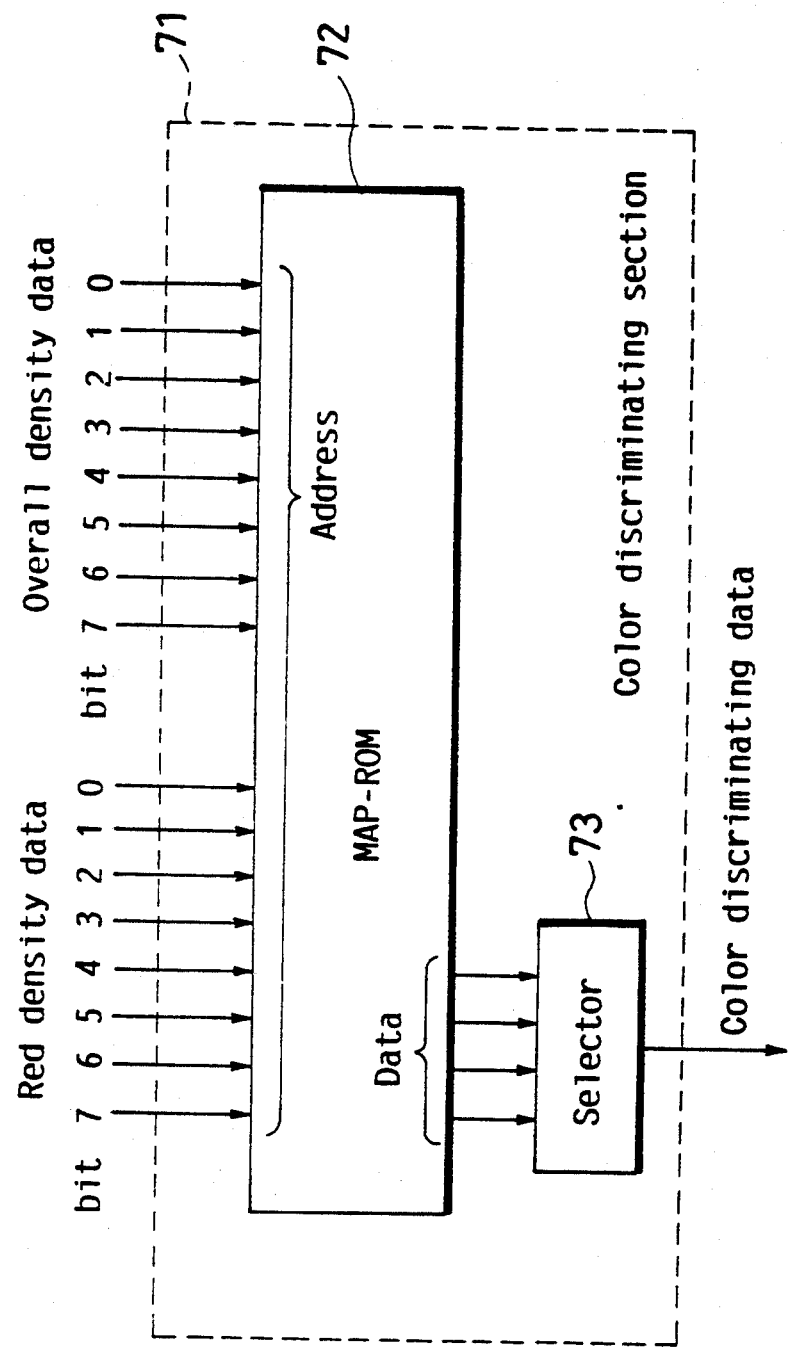
FIG. 5 is a block diagram showing the construction of a color discriminating section.

The color discriminating section 71 comprises, as shown in FIG. 5, a MAP-ROM 72 and a selector 73. Into the MAP-ROM 72, are inputted as an address the red density data outputted from the delay section 61 and the overall density data outputted from the shading compensating section 42.

Figure 6B:
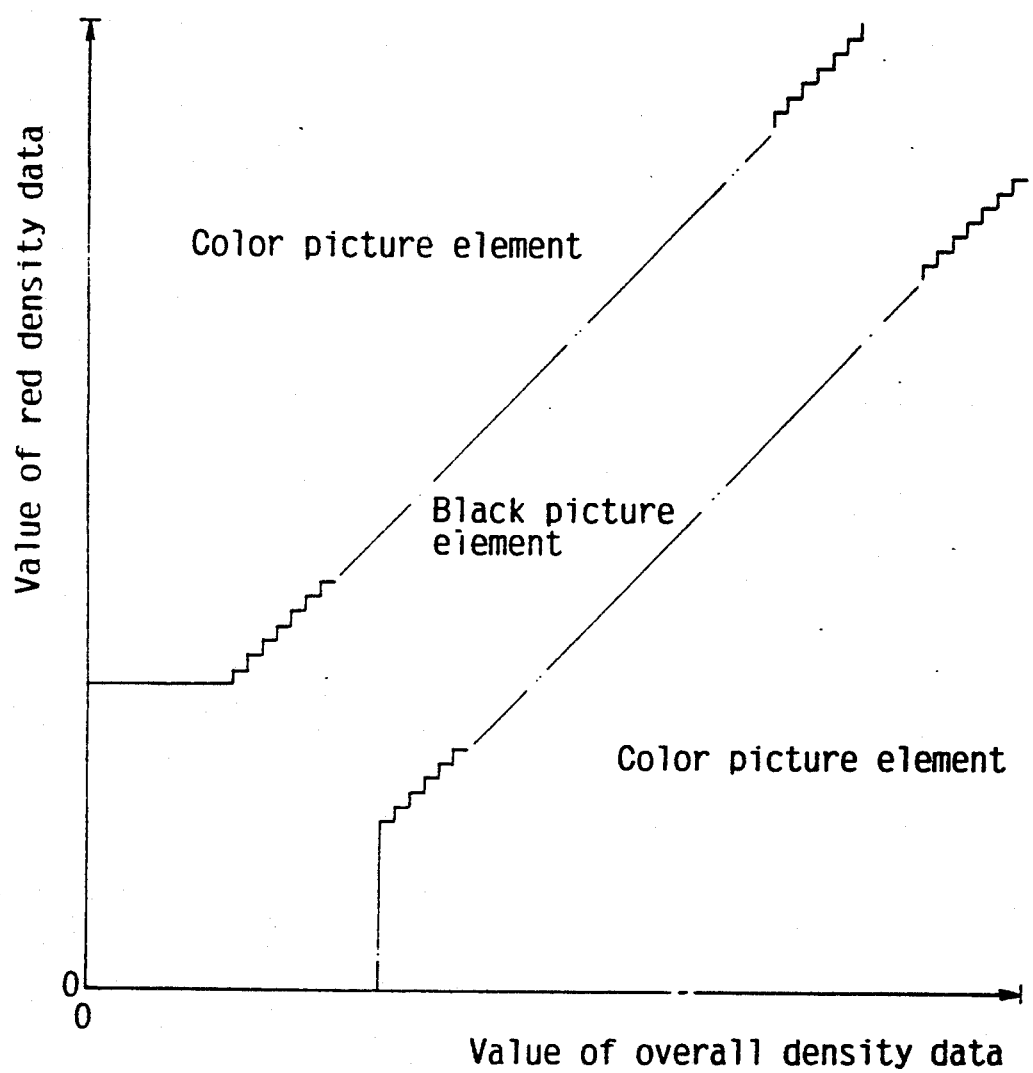

The MAP-ROM 72 stores three color discriminating maps shown in FIGS. 6a–6c. The maps are used to determine whether each picture element is a black element or a color element in accordance with the red density data and overall density data. The MAP-ROM 72 outputs three kinds of color discriminating data, respectively corresponding to the maps, in accordance with the address inputted thereto. That is, the color of each picture element is determined based on the ratio of the red density data to the overall density data and difference therebetween (chromatic factors) and absolute values thereof (luminous factor). The selector 73 is for selectively outputting one of the above three color discriminating data in response to a control signal (not shown).

The electric magnification changing section 81 processes the color discriminating data and the overall density data in order to convert the read image data into an image data corresponding to an image enlarged, reduced or moved in the main scanning direction. In the case of enlargement and reduction in the sub scanning direction, the scanning speed of the first slider unit 21 is changed.

The data compensating section 82 compensates for deterioration of the image quality due to noise or the like and effects image processing such as color conversion and gradation conversion.

In the above construction, the original image is read as follows.

The first and second slider units 21 and 25 start to be moved in the sub scanning direction, whereby an image corresponding to the image of the original document D is formed on the first and second CCD line sensors 32 and 33.

The second CCD line sensor 33 reads the original image data corresponding to one line each time the line clock signal is inputted and outputs an analog signal corresponding to the density of a red component of each picture element each time the reference clock signal is inputted. In the same way, the first CCD line sensor 32 outputs an analog signal corresponding to the density of all the color components of each picture element with a delay of the image-forming time lag.

The analog signals outputted from the sensors 33 and 32 are respectively inputted to the A/D convert sections 51 and 41 where the analog signals are converted into digital signals. The digital signals are respectively outputted as the red density data and the overall density data and inputted to the shading compensating sections 52 and 42.

The red density data outputted from the shading compensating section 52 is inputted to the delay section 61 to be delayed a time corresponding to the image-forming time lag. The delayed red density data is inputted to the color discriminating section 71.

The above delay of the red density data is explained below in detail. For easy explanation, assume that one line of the original image consists of three picture elements and that the image-forming time lag between the second and first CCD line sensors 33 and 32 corresponds to 2 lines in a same-sized reading mode.

Figure 7A:
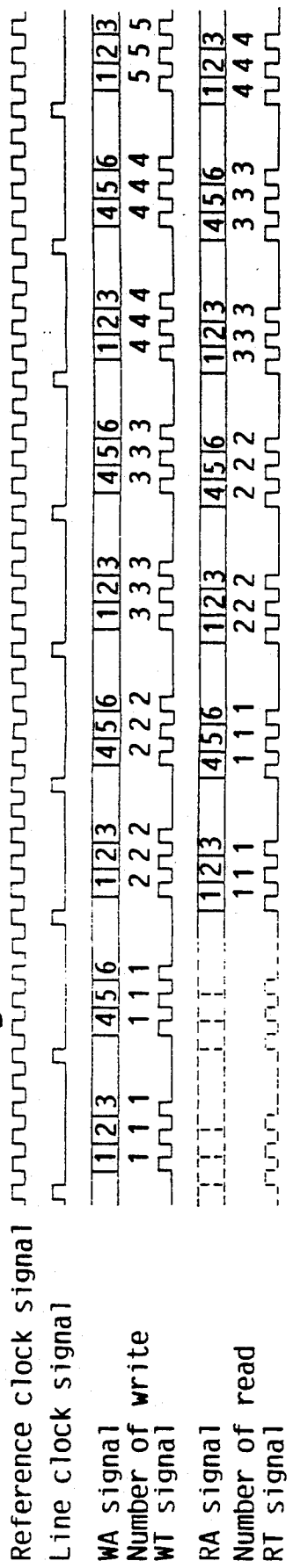
FIGS. 7a through 7c are timing charts showing the operation of the delay section.

In the same-sized reading mode, the address controller 63, as shown in FIG. 7a, outputs three write timing signals (referred to as WT signals, hereinafter) each time the line clock signal is outputted. The address controller 63 also outputs a write address assigning signal (referred to as a WA signal, hereinafter) which is incremented each time the WT signal is outputted. The delay memory 62 stores the red density data in a memory area assigned by the WA signal.

Further, the address controller 63 outputs a time lag signal indicating amount of the image-forming time lag, a magnification signal indicating a reading magnification, a read address assigning signal (referred to as an RA signal, hereinafter), for assigning the same address as the WA signal with a delay of the image-forming time lag and a read timing signal (referred to as an RT signal, hereinafter). The delay memory 62 reads the red density data stored in a memory area assigned by the RA signal.

That is, the delay memory 62 outputs the red density data in synchronism with output of the overall density data for the same picture element. Since the memory area storing the red density data cannot be used until the stored data is read out, the delay memory 62 is required to have a memory capacity for 2 lines (6 picture elements).

Next, the case of a double-sized reading mode will be explained.

The first slider unit 21 is moved at half the speed of the same-sized reading mode, whereby the original image is read in double the picture element density of the same-sized reading mode. In this mode, the image-forming time lag corresponds to 4 lines.

Figure 7B:
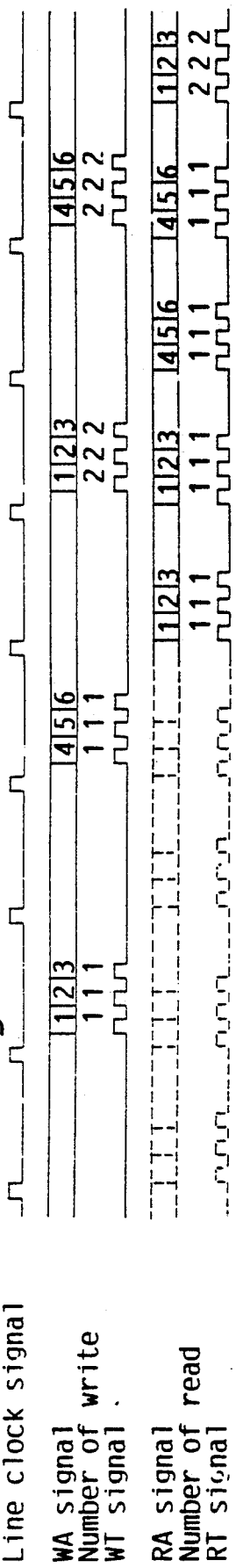
Figure 7C:
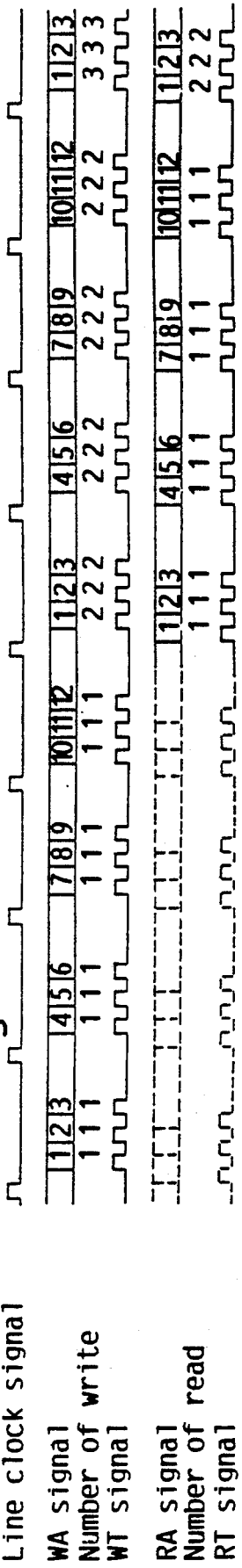

As shown in FIG. 7b, the address controller 63 outputs three WT signals when the line clock signal is outputted even-numbered times. This means that the red density data is reduced and stored in the delay memory 62. Therefore, the delay memory 62 is only required to have the same memory capacity as the same-sized reading mode, that is, the memory capacity of 2 lines (6 picture elements). For comparison, FIG. 7c shows the case where the WT signals are outputted each time the line clock signal is outputted, whereby the red density data is stored without being reduced. In FIG. 7c, a memory capacity of 4 lines (12 picture elements), which is double the memory capacity of that in FIG. 7b, is necessary.

On the other hand, three RT signals are outputted from the address controller 63 each time the line clock signal is outputted and two RA signals assigning the same address are outputted. As a result, the red density data outputted from the delay memory 62 is the same in number as the inputted data but has substantially half the picture element density thereof.

The red density data outputted from the delay memory 62 and the overall density data outputted from the shading compensating section 42 are inputted to the MAP-ROM 72 as an address. The MAP-ROM 72 outputs three color discriminating data on the basis of the color discriminating maps stored therein. The selector 73 selectively outputs one of the color discriminating data.

For example, where the color discriminating map shown in FIG. 6a is applied, a color discriminating data indicating a red picture element is outputted when the value of the red density data is high and the value of the overall density data is low (corresponding to an area A in FIG. 6a). On the other hand, a color discriminating data indicating a black picture element is outputted when the value of the red density data is low (an area B) and when the value of the overall density data is high (an area C).

The color discriminating data and the overall density data outputted from the shading compensating section 42 are inputted to the electric magnification changing section 81.

Then, the color discriminating data and the density data are outputted from the signal processing section 35 after being processed in the data compensating section 82.

The color discriminating data and the density data obtained as above are used, for example, to change a print head in accordance with the color of the toner and to modulate an intensity of a laser beam in an electrophotographic image forming apparatus provided with a plurality of print heads.

Figure 8:
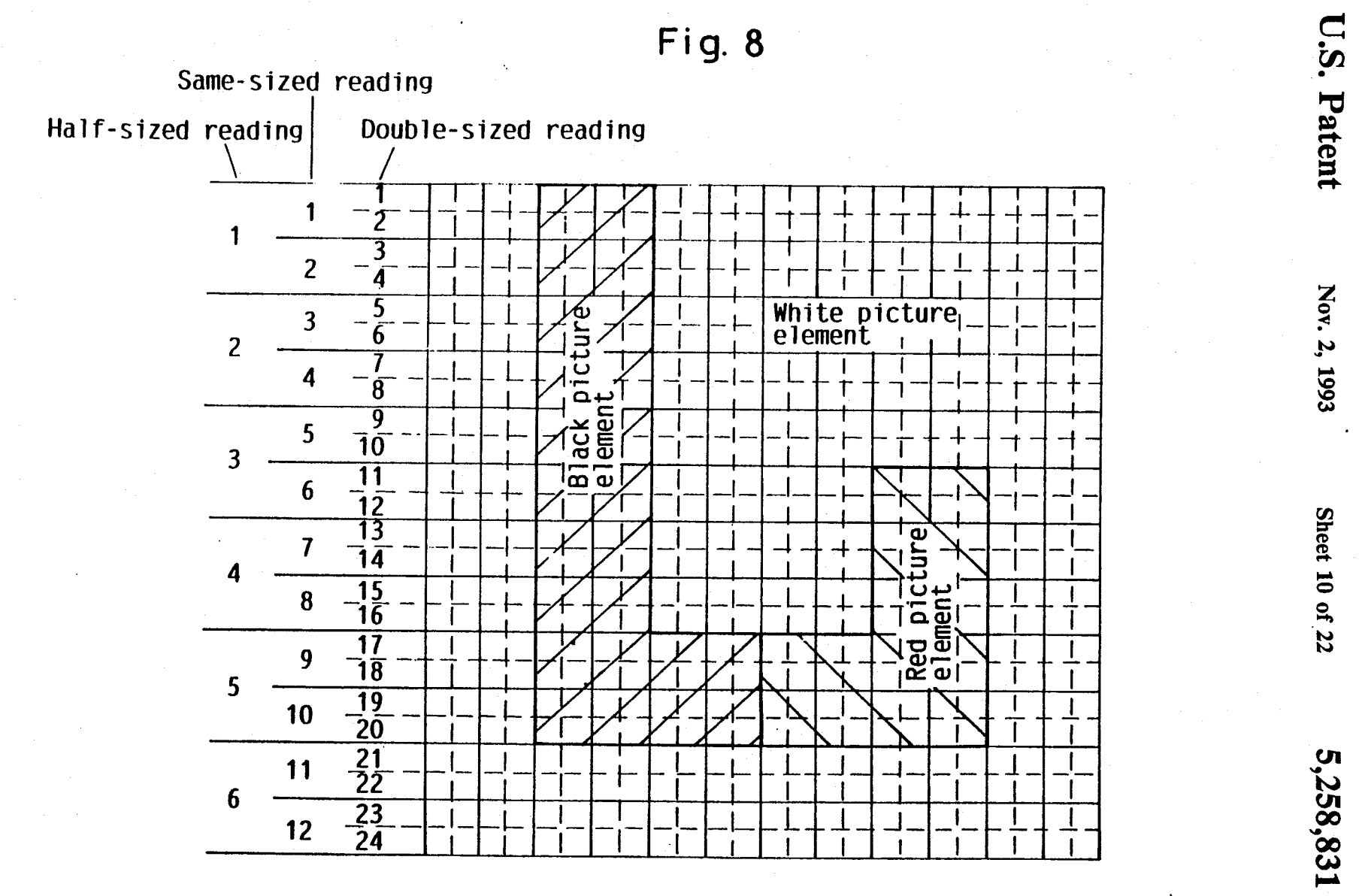

FIG. 8 shows an original image having 12×12 picture elements in the same-sized reading mode. Operations for reading this image in the same-sized reading mode, half-sized reading mode and double-sized reading mode will be explained hereinafter. In the following explanation, each of the red density data and the overall density data for one picture element is a 1-bit data (two gradations). The value of the overall density data is 1 when the corresponding picture element is white and 0 when the picture element is black or red. On the other hand, the value of the red density data is 1 when the corresponding picture element is white or red and 0 when the picture element is black. Both data are expressed in the hexadecimal notation.

1) Same-sized reading mode

The red density data is outputted from the delay section 61 with a delay corresponding to 2 lines, thereby being inputted to the color discriminating section 71 in synchronism with the overall density data, as shown in Table 1 below.

TABLE 1

| line | red density data section 52 | section 61 | overall density data section 42 | color discrim. data section 71 | density data | color discrim. data section 82 |
|---|---|---|---|---|---|---|
| — | CFF | — | — | — | — | — |
| — | CFF | — | — | — | — | — |
| 1 | CFF | CFF | CFF | 000 | 300 | 000 |
| 2 | CFF | CFF | CFF | 000 | 300 | 000 |
| 3 | CFF | CFF | CFF | 000 | 300 | 000 |
| 4 | CFF | CFF | CFF | 000 | 300 | 000 |
| 5 | CFF | CFF | CFF | 000 | 300 | 000 |
| 6 | CFF | CFF | CF3 | 00C | 30C | 00C |
| 7 | C3F | CFF | CF3 | 00C | 30C | 00C |
| 8 | C3F | CFF | CF3 | 00C | 30C | 00C |
| 9 | FFF | C3F | C03 | 03C | 3FC | 03C |
| 10 | FFF | C3F | C03 | 03C | 3FC | 03C |
| 11 | — | FFF | FFF | 000 | 000 | 000 |
| 12 | — | FFF | FFF | 000 | 000 | 000 |

The MAP-ROM 72 outputs, as a color discriminating data, the value of a data stored in a memory area having an address consisting of the value of the red density data outputted from the delay section 61 and the value of the overall density data outputted from the shading compensating section 42. When the value of the red density data is 1 and the value of the overall density data is 0 (for example, the ninth and tenth picture elements from the left in the sixth line), the MAP-ROM 72 outputs a color discriminating data having a value of 1.

Where each of the overall density data and the red density data is a 1-bit binary data as above, a NOT circuit for inverting the value of the overall density data and an AND circuit for finding the logical product of the output of the NOT circuit and the value of the red density data can be employed instead of the MAP-ROM 72.

The electric magnification changing section 81 outputs the density data and the color discriminating data as they are to the data compensating section 82.

The section 82 inverts the value of the overall density data and outputs 1 when the corresponding picture element is black.

2) Half-sized reading mode

The first slider unit 21 is moved at twice the speed of the same-sized reading mode, whereby the original image is read in half the picture element density thereof in the sub scanning direction. In this mode, the image-forming time lag corresponds to 1 line. Table 2 below shows how the red density data outputted from the shading compensating section 52 is inputted to the color discriminating section 71 in synchronism with the overall density data.

TABLE 2

| line | red density data section 52 | overall density data section 61 | color discrim. data section 42 | density data section 71 | color discrim. data section 82 |
|---|---|---|---|---|---|
| — | CFF | — | — | — | — |
| 1 | CFF | CFF | CFF | 000 | 400 | 000 |
| 2 | CFF | CFF | CFF | 000 | 400 | 000 |
| 3 | CFF | CFF | CFF | 000 | 400 | 000 |
| 4 | C3F | CFF | CF3 | 00C | 480 | 080 |
| 5 | FFF | C3F | C03 | 03C | 780 | 180 |
| 6 | — | FFF | FFF | 000 | 000 | 000 |

The color discriminating section 71 outputs a color discriminating data in the same way as the same-sized reading mode.

The electric magnification changing section 81 converts the color discriminating data and the overall density data into those corresponding to a half-sized image by compressing them to the left. The data compensating section 82 inverts the value of the overall density data and outputs the inverted value.

3) Double-sized reading mode

The first slider unit 21 is moved at half the speed of the same-sized reading mode in the sub scanning direction, whereby the original image is read in double the picture element density of the same-sized reading mode. In this mode, the image-forming time lag corresponds to 4 lines.

The delay section 61, as shown in Table 3 below, stores only the red density data of even-numbered lines marked with * and outputs the same data twice respectively with a delay of 3 lines and with a delay of 4 lines. Thus, the red density data is reduced to be half in the picture element density and outputted to the color discriminating section 71 in synchronism with the overall density data.

TABLE 3-1

| line | red density data section 52 | section 61 | overall density data section 42 | color discrim. data section 71 | density data | color discrim. data section 82 |
|---|---|---|---|---|---|---|
| — | CFF | — | — | — | — | — |
| — | *CFF | — | — | — | — | — |
| — | CFF | — | — | — | — | — |
| — | *CFF | — | — | — | — | — |

TABLE 3-1-continued

| line | red density data section 52 | overall density data section 61 | color discrim. data section 42 | density data section 71 | color discrim. data section 82 | |
|---|---|---|---|---|---|---|
| 1 | CFF | CFF | CFF | 000 | 0F0000 | 000000 |
| 2 | *CFF | same | CFF | 000 | 0F0000 | 000000 |
| 3 | CFF | CFF | CFF | 000 | 0F0000 | 000000 |
| 4 | *CFF | same | CFF | 000 | 0F0000 | 000000 |
| 5 | CFF | CFF | CFF | 000 | 0F0000 | 000000 |
| 6 | *CFF | same | CFF | 000 | 0F0000 | 000000 |
| 7 | CFF | CFF | CFF | 000 | 0F0000 | 000000 |
| 8 | *CFF | same | CFF | 000 | 0F0000 | 000000 |
| 9 | CFF | CFF | CFF | 000 | 0F0000 | 000000 |
| 10 | *CFF | same | CFF | 000 | 0F0000 | 000000 |

TABLE 3-2

| line | red density data section 52 | overall density data section 61 | color discrim. data section 42 | density data section 71 | color discrim. data section 82 | |
|---|---|---|---|---|---|---|
| 6 | *CFF | same | CFF | 000 | 0F0000 | 000000 |
| 11 | CFF | CFF | CF3 | 00C | 0F00F0 | 0000F0 |
| 12 | *CFF | same | CF3 | 00C | 0F00F0 | 0000F0 |
| 13 | C3F | CFF | CF3 | 00C | 0F00F0 | 0000F0 |
| 14 | *C3F | same | CF3 | 00C | 0F00F0 | 0000F0 |
| 15 | C3F | CFF | CF3 | 00C | 0F00F0 | 0000F0 |
| 16 | *C3F | same | CF3 | 00C | 0F00F0 | 0000F0 |
| 17 | FFF | C3F | C03 | 03C | 0FFFF0 | 000FF0 |
| 18 | *FFF | same | C03 | 03C | 0FFFF0 | 000FF0 |
| 19 | FFF | C3F | C03 | 03C | 0FFFF0 | 000FF0 |
| 20 | *FFF | same | C03 | 03C | 0FFFF0 | 000FF0 |
| 21 | — | FFF | FFF | 000 | 000000 | 000000 |
| 22 | — | same | FFF | 000 | 000000 | 000000 |
| 23 | — | FFF | FFF | 000 | 000000 | 000000 |
| 24 | — | same | FFF | 000 | 000000 | 000000 |

In this case, resolution of the color discrimination is lowered a little since the red density data is reduced. However, visual influence such lowering has on the image quality is negligible. Especially, when an area of red picture elements exists in a caption or a cut which is not close to an area of black picture elements generally, the image quality is not affected by the lowering of the resolution at all.

When the red density data is reduced as above, the delay memory 62 is only required to have a memory capacity of 24 bits which is the half of 48 bits required when the red density data is not reduced. Considering that one picture practically consists of thousands of lines, being small in the memory capacity produces great effect. Further, other circuits such as the address controller 63 can be compact and the number of lines can be reduced. As a result, improvement in processing speed can easily be realized.

The electric magnification changing section 81 converts the color discriminating data and red density data into those corresponding to a double-sized image by expanding them to the right.

In the above embodiment, the same red density data is read out of the delay section 61 twice in the double-sized reading mode. Color discrimination can be effected by reducing not only the red density data but also the overall density data.

The red density data may be reduced when it is read by the second CCD line sensor 33 or when it is processed in the A/D convert section 51.

Further, the red density data may also be reduced in the same-sized reading mode, etc.

The picture element density of the red density data may be lowered by converting the picture element density instead of reducing the red density data as above. Such conversion is effected by, for example, finding out the average density of a plurality of picture elements.

In the above embodiment, the color discriminating data and the density data are compressed or expanded with the left end thereof being fixed. The compression and expansion may be effected with the center of the data being fixed.

Second Embodiment

A second embodiment of the present invention will be explained hereinafter, referring to FIGS. 9 through 13. In this embodiment, the picture element density is lowered in a different direction from the first embodiment, namely, in the main scanning direction. In the second embodiment, the same numerals are used for the same members as the first embodiment and explanation thereof is eliminated.

Figure 9:
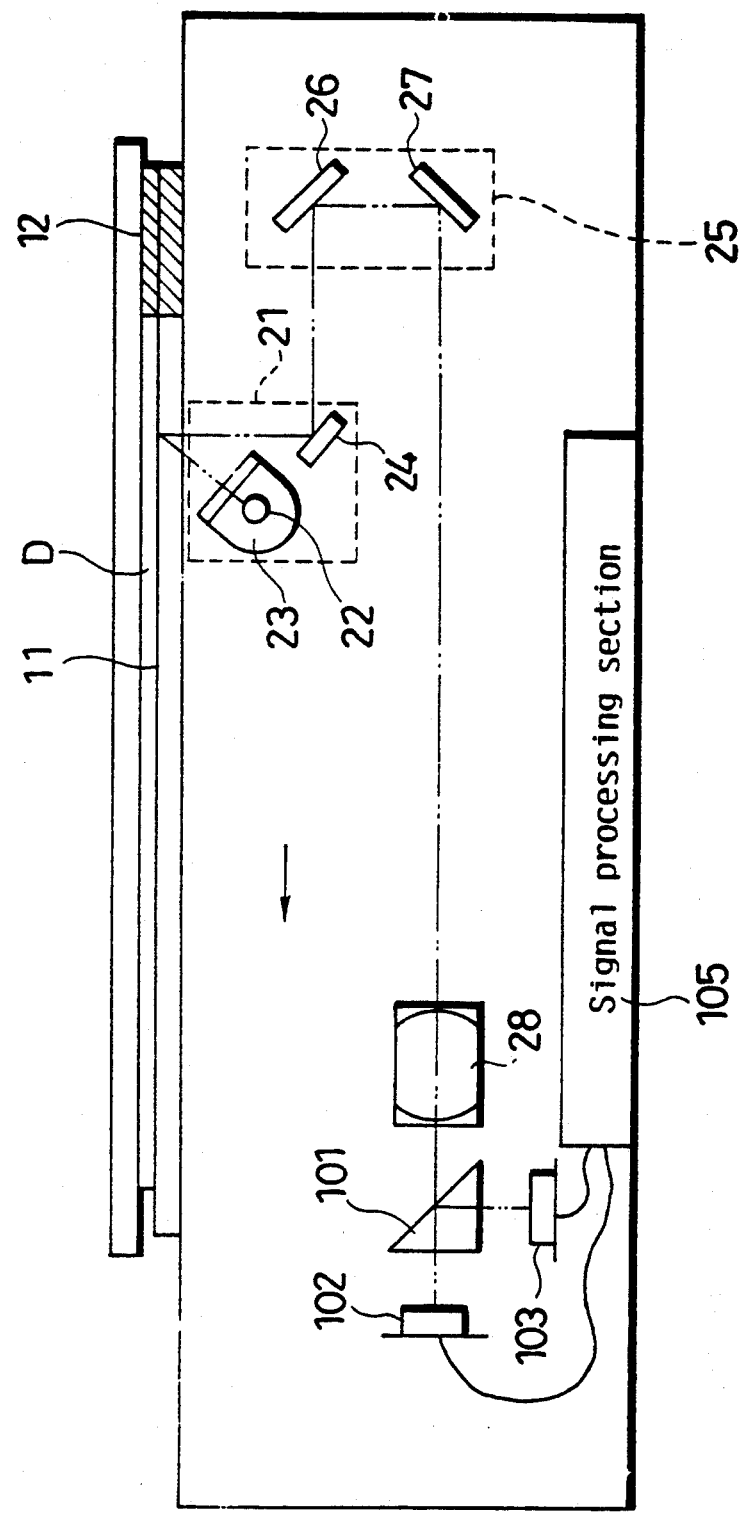
FIG. 9 is a front sectional view showing the construction of an image reading device according to a second embodiment of the present invention.

In FIG. 9, 101 is a dichroic prism, 102 is a main CCD line sensor which has a detecting element density of 400 DPI (dot per inch) and 5000 detecting elements in total, 103 is a sub CCD line sensor which has a detecting element density of 200 DPI and 2500 detecting elements in total and 105 is a signal processing section.

Figure 10:
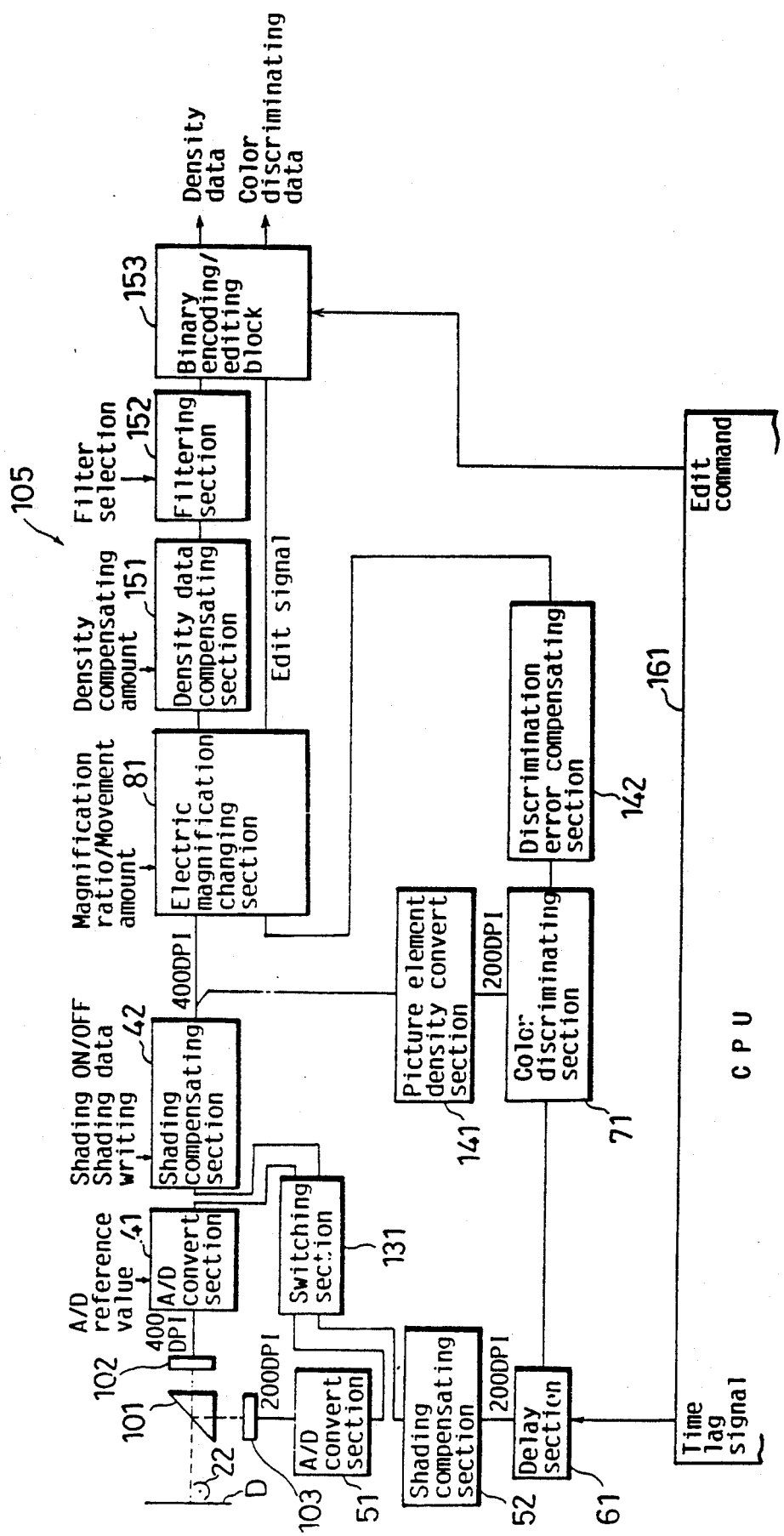
FIG. 10 is a block diagram showing the construction of a signal processing section.

In FIG. 10, 131 is a switching section, 141 is a picture element density convert section, 142 is a discrimination error compensating section, 151 is a density data compensating section, 152 is a filtering section, 153 is a binary encoding/editing block and 161 is a CPU.

Figure 11A:
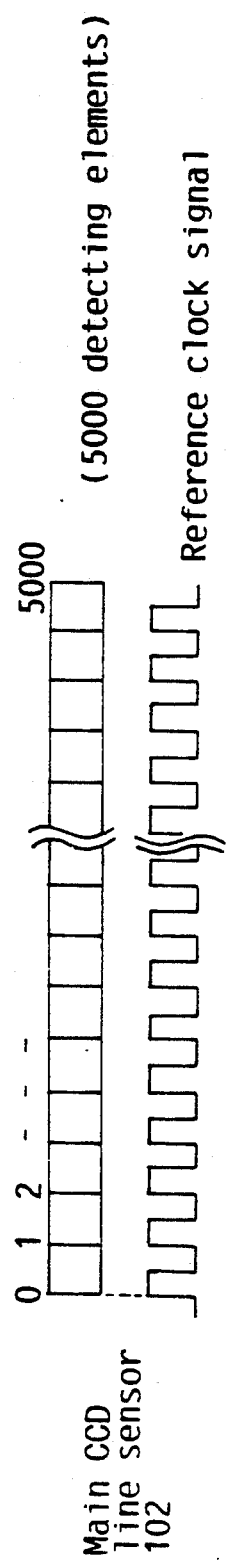
FIG. 11a is an explanatory view showing the relationship between the number of picture elements detected by a main CCD line sensor and a reference clock signal.
Figure 11B:
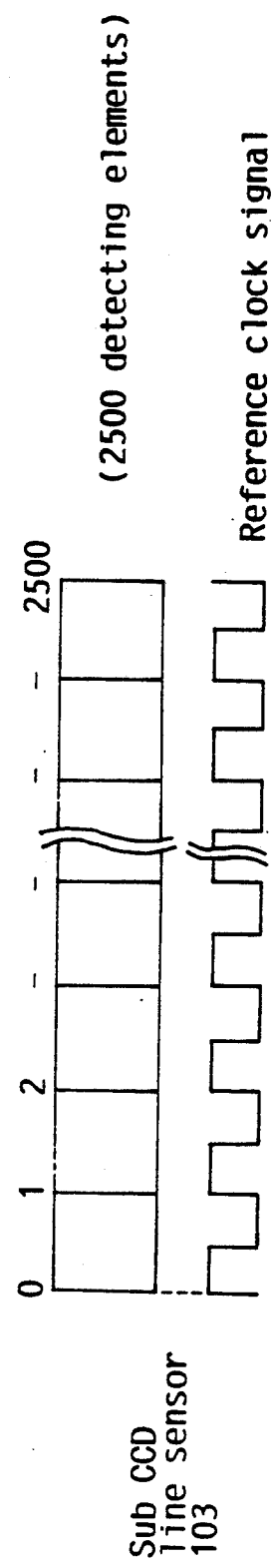
FIG. 11b is an explanatory view showing the relationship between the number of picture elements detected by a sub CCD line sensor and a reference clock signal.

The dichroic prism 101 divides the light reflected on the original document D into a red light and a light of complementary colors. The red light and light of complementary colors are respectively guided to the sub CCD line sensor 103 and the main CCD line sensor 102. That is, for each picture element, the main CCD line sensor 102 and the sub CCD line sensor 103 respectively detect the density of the complementary colors (referred to as a complementary density, hereinafter) and the density of red (red density) on the basis of reference clock signals having frequencies corresponding to the detecting element densities, as shown in FIGS. 11a and 11b. The light reflected on the document D may be divided by means of a half mirror or the like instead of the dichroic prism 101.

The switching section 1 31 switches the connections between the A/D convert sections 41 and 51, and the shading compensating sections 42 and 52 so that the density data can be outputted even if the main CCD line sensor 102 is damaged.

The delay section 61 delays output of the red density data from the shading compensating section 52 on the basis of the time lag signal. If the CCD line sensors are positioned accurately, the delay section 61 may be eliminated.

Figure 12:
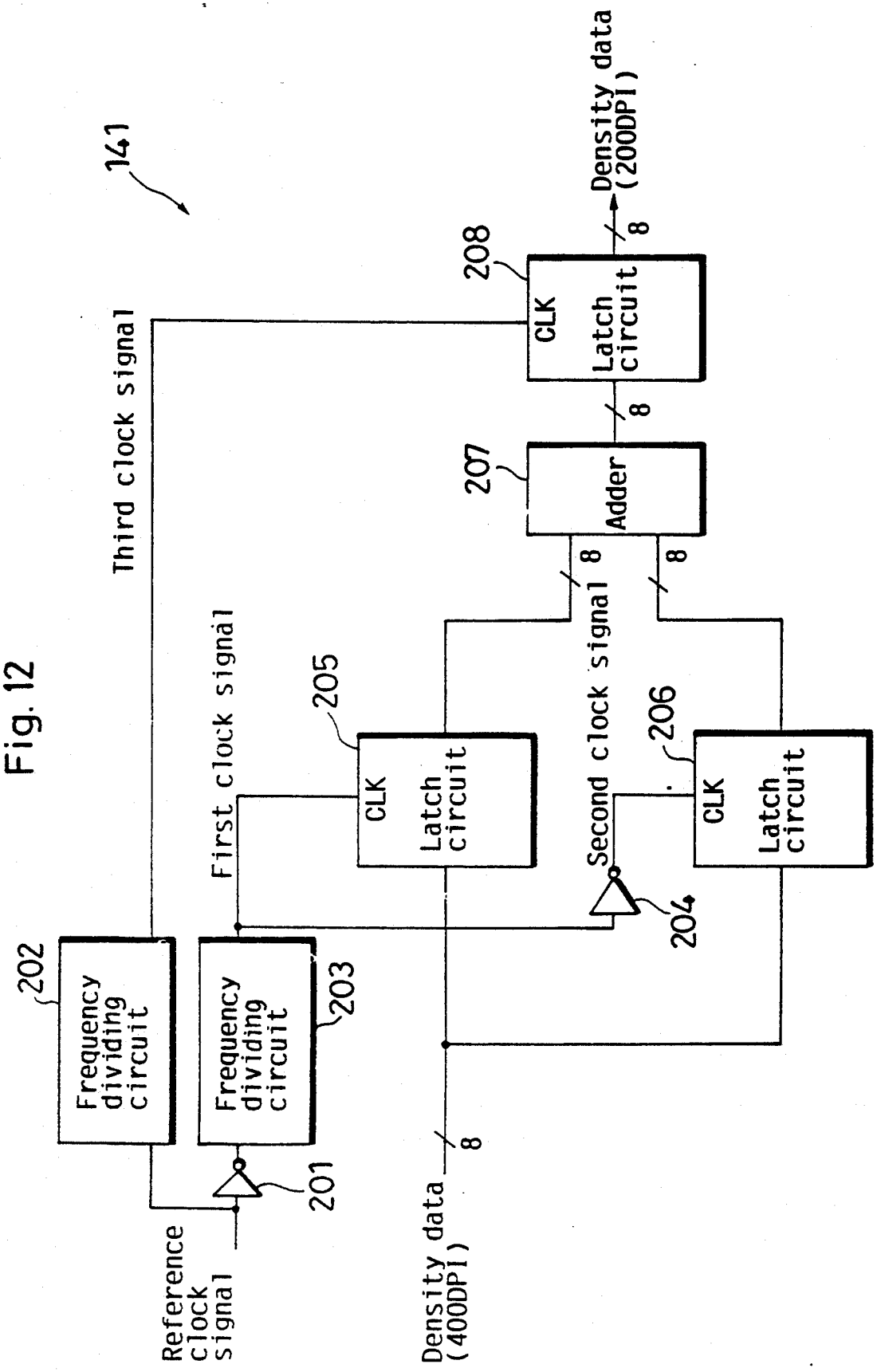
FIG. 12 is a block diagram showing the construction of a picture element density convert section.

The picture element density convert section 141, as shown in FIG. 12, comprises NOT circuits 201 and 204, frequency dividing circuits 202 and 203, latch circuits 205, 206 and 208, and an adder 207. The complementary density data of 400 DPI outputted from the shading compensating section 42 is converted into a density data of 200 DPI.

The discrimination error compensating section 142 compensates for error in color discrimination due to noise or the like by means of a known algorithm.

In the density data compensating section 151, the density data is subjected to image processing, such as gradation conversion.

The value of the complementary density data of a picture element which has been judged to be red may be increased in the density data compensating section 151 so that it substantially indicates the density of all the color components.

The filtering section 152 effects filtering processes such as an edge exaggeration and a smoothing. The binary encoding/editing block 153 effects a binary encoding process, a dither process, a trimming process, a masking process, a negative/positive reversing process and an information reversing process.

The CPU 161 sets parameters of the above sections and controls operations thereof.

In the above construction, the original image is read in the same way as the first embodiment. The main and sub CCD line sensors 102 and 103 detect the complementary density and the red density with movement of the first slider unit 21 in the sub scanning direction.

An analog signal outputted from the main CCD line sensor 102 is amplified and converted into a digital signal in the A/D convert section 41. The digital signal is inputted as the complementary density data into the shading compensating section 42 through the switching section 131. After the shading compensation, the complementary density data is inputted to the picture element density convert section 141 on one hand and inputted as the overall density data to the electric magnification changing section 81 on the other hand.

Figure 13:
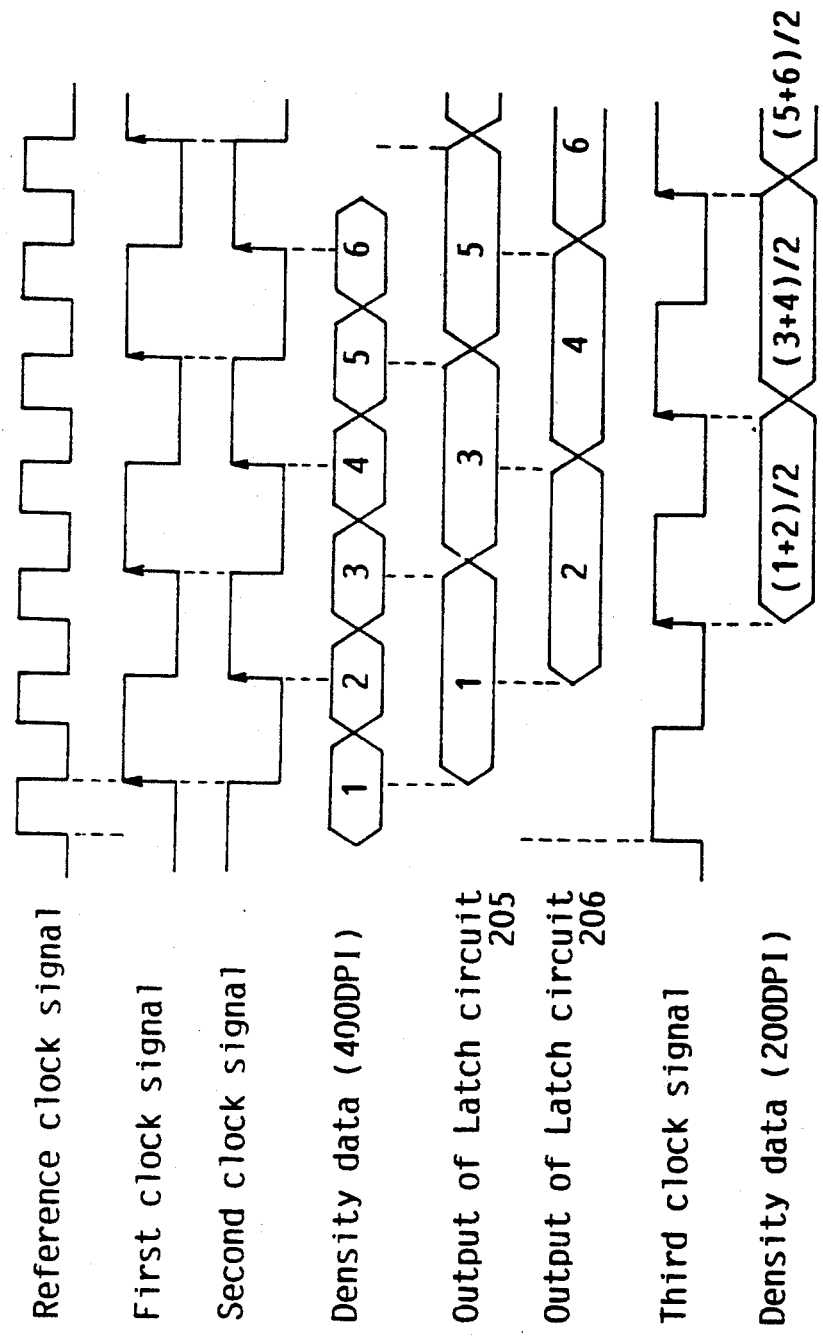
FIG. 13 is a timing chart showing the operation of the picture element density convert section.

The picture element density convert section 141, as shown in FIG. 13, generates a first clock signal which is obtained by dividing the frequency of the reference clock signal by two, a second clock signal whose phase is shifted 180° from the first clock signal and a third clock signal whose phase is shifted 90° from the second clock signal.

The latch circuits 205 and 206 alternately latch the 400 DPI complementary density data on the basis of the first and second clock signals. The adder 207 adds the density data outputted from the latch circuit 205 and the density data outputted from the latch circuit 206 and shifts the added data by one bit. In this way, an average density of two adjacent picture elements is calculated to be outputted as a density data of one picture element.

The density data outputted from the adder 207 is latched by the latch circuit 208 on the basis of the third clock signal and outputted to the color discriminating section 71 as a 200 DPI complementary density data. The picture element density may be converted by reducing the density data instead of calculating the average value as above. Further, conversion ratio of the picture element density is not limited to 2:1 but may be another ratio. If the conversion ratio is an integral ratio, the conversion can be effected with a simple construction.

On the other hand, an analog signal outputted from the sub CCD line sensor 103 is amplified and converted into a digital signal in the A/D convert section 51. The digital signal is inputted as the red density data into the shading compensating section 52 through the switching section 131. After shading compensation, the red density data is delayed by the delay section 61 and inputted to the color discriminating section 71 in synchronism with the 200 DPI complementary density data.

The color discriminating data outputted from the color discriminating section 71 is inputted to the electric magnification changing section 81 after discrimination error is compensated in the discrimination error compensating section 142.

In the electric magnification changing section 81, the 400 DPI complementary density data and the color discriminating data are converted into those corresponding to an enlarged or reduced image.

The color discriminating data is outputted through the binary encoding/editing block 153, while the density data is outputted through the density data compensating section 151, the filtering section 152 and the binary encoding/editing block 153.

As described above, in this embodiment, the picture element density in the main scanning direction of the red density data is lowered by employing the sub CCD line sensor 103 having a lower detecting element density than the main CCD line sensor 102. This brings about the following advantages. In addition to the sub CCD line sensor 103 itself being low in cost, costs of members such as an A/D converter are reduced due to low processing speed in A/D conversion and color discrimination. Further, circuit construction can easily be simplified and memory capacity of the delay section 61 need not be so large.

Figure 14:
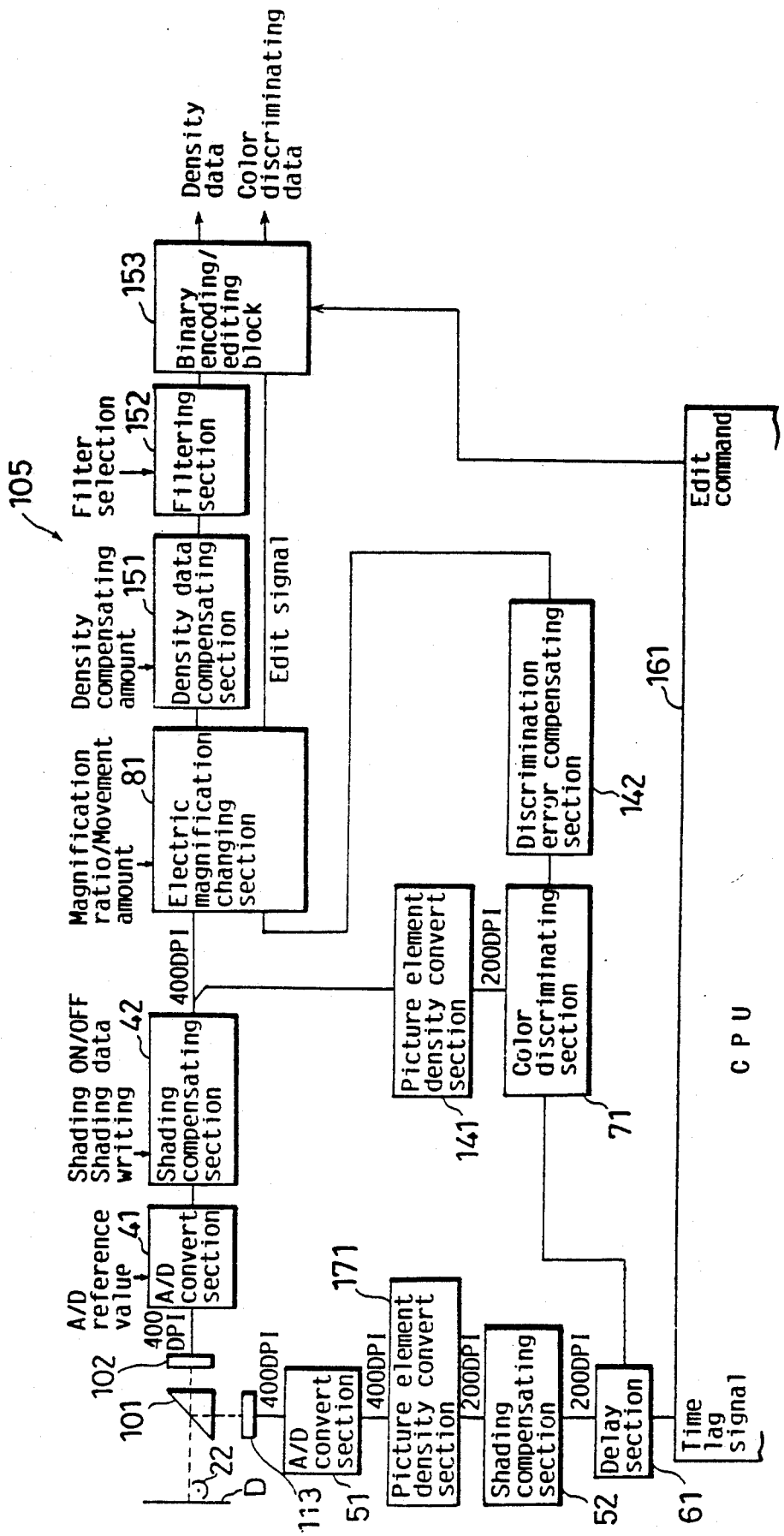
FIG. 14 is a front sectional view showing the construction of an image reading device according to a third embodiment of the present invention.

The picture element density of the red density data in the main scanning direction may also be lowered by providing a sub CCD line sensor 113 having a 400 DPI detecting element density and a picture element density convert section 171, as shown in FIG. 14. The picture element density convert section 171 has the same construction as the picture element density convert section 141. In this case also, constructions of the shading compensating sections 52 and the delay section 61, etc. can be simplified and manufacturing cost of the device can be reduced.

In the second embodiment also, the picture element density may be lowered in accordance with the reading magnification as in the first embodiment.

Third Embodiment

A third embodiment of the present invention will be described hereinafter, referring to FIGS. 15 through 18. In this embodiment, color discrimination is effected on the basis of an image data having a small number of density level. In this embodiment also, the same numerals are employed for the same members as the first embodiment.

Figure 15:
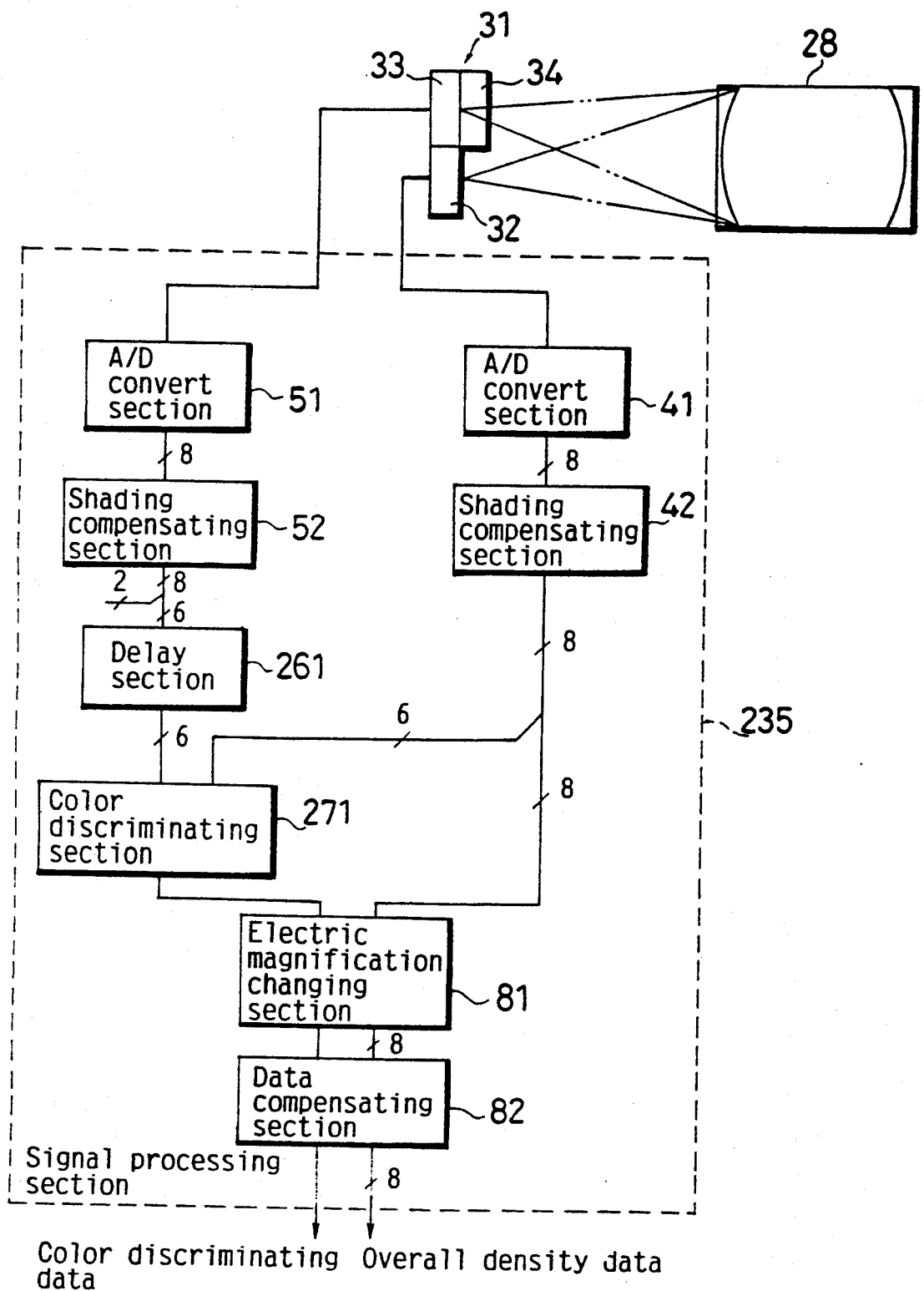
FIG. 15 is a block diagram showing the construction of a signal processing section.

An image reading device according to the third embodiment is, as shown in FIG. 15, equipped with a delay section 261 and a signal processing section 235 including a color discriminating section 271 instead of the delay section 61 and the color discriminating section 71 in the first embodiment.

Figure 16:
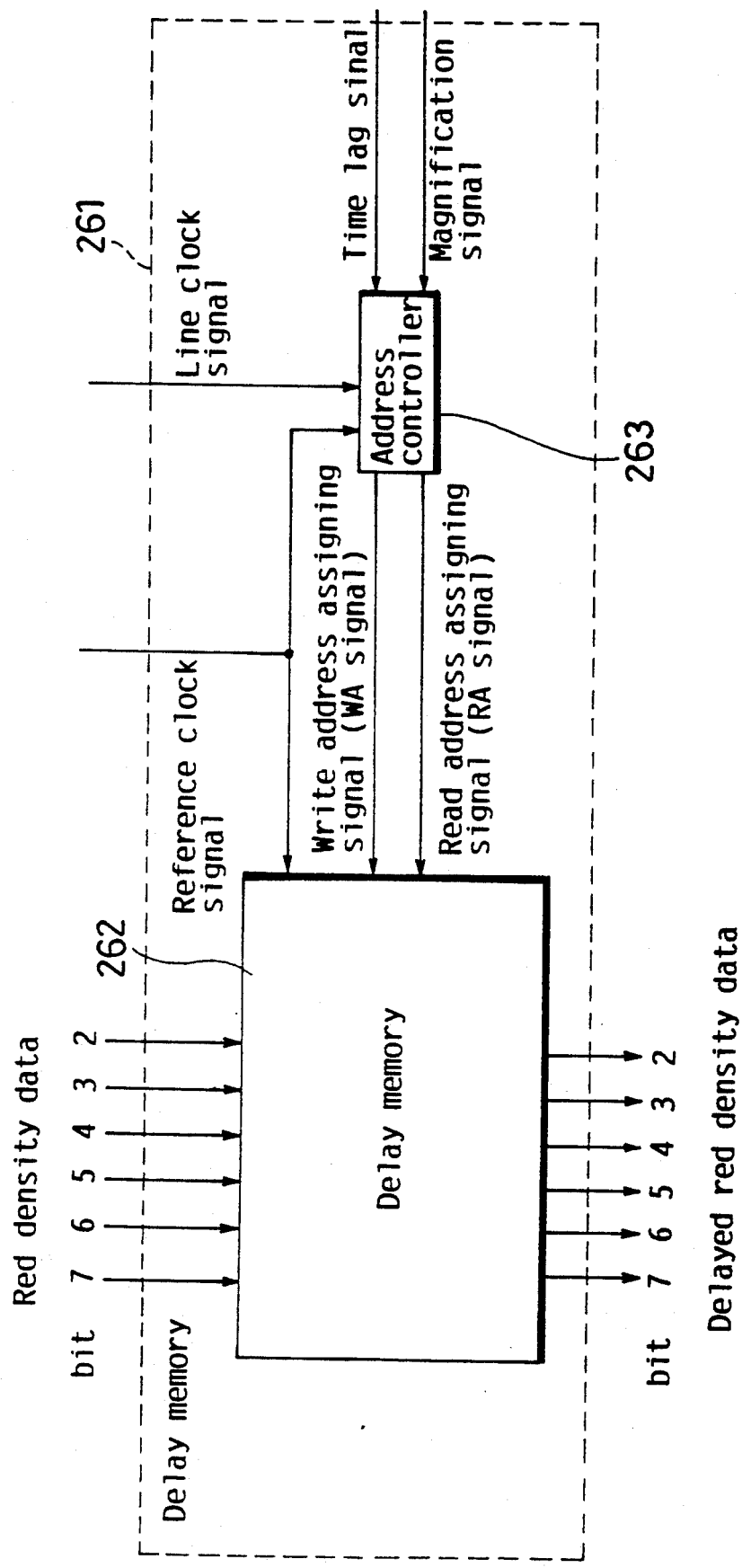
FIG. 16 is a block diagram showing the construction of a delay section.

The delay section 261 comprises, as shown in FIG. 16, a delay memory 262 and an address controller 263.

Figure 17:
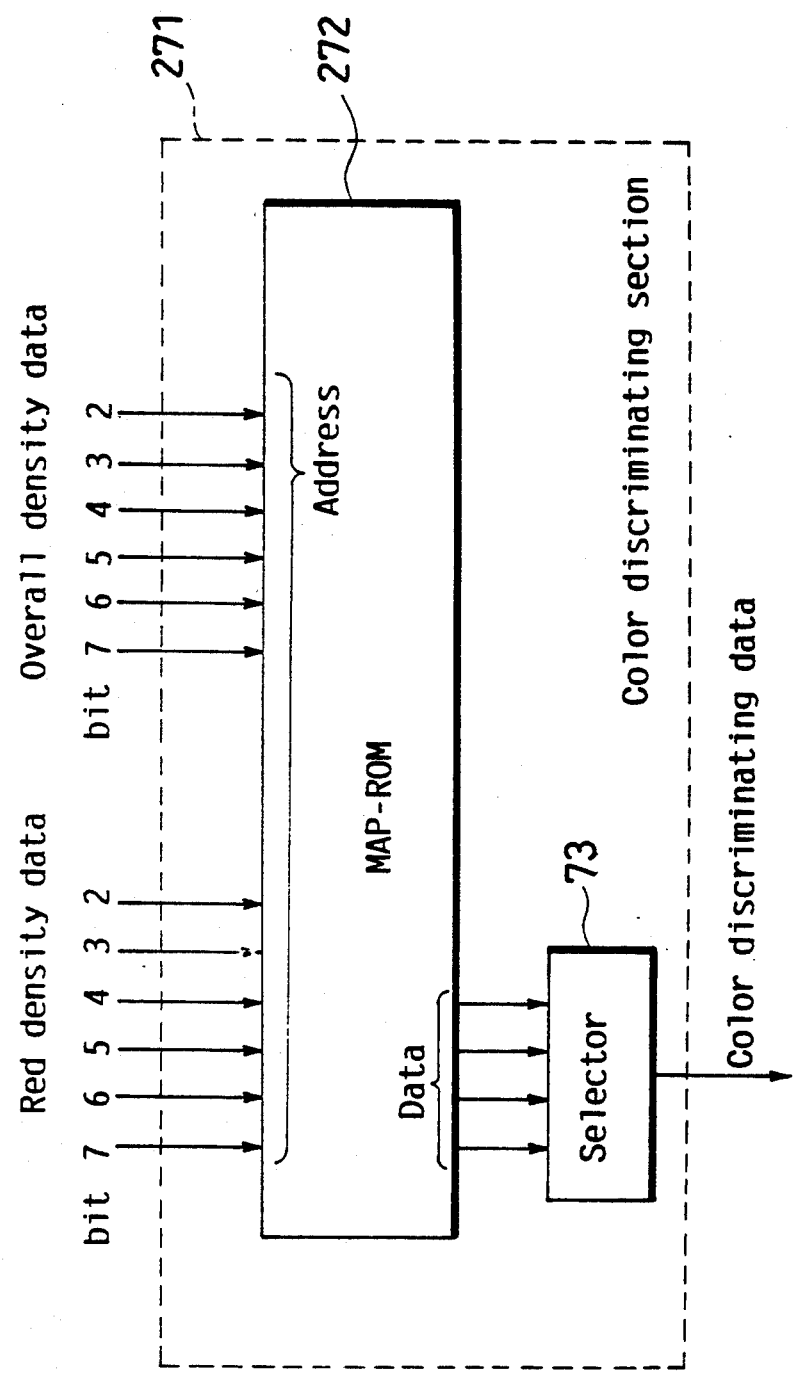
FIG. 17 is a block diagram showing the construction of a color discriminating section.
Figure 18A:
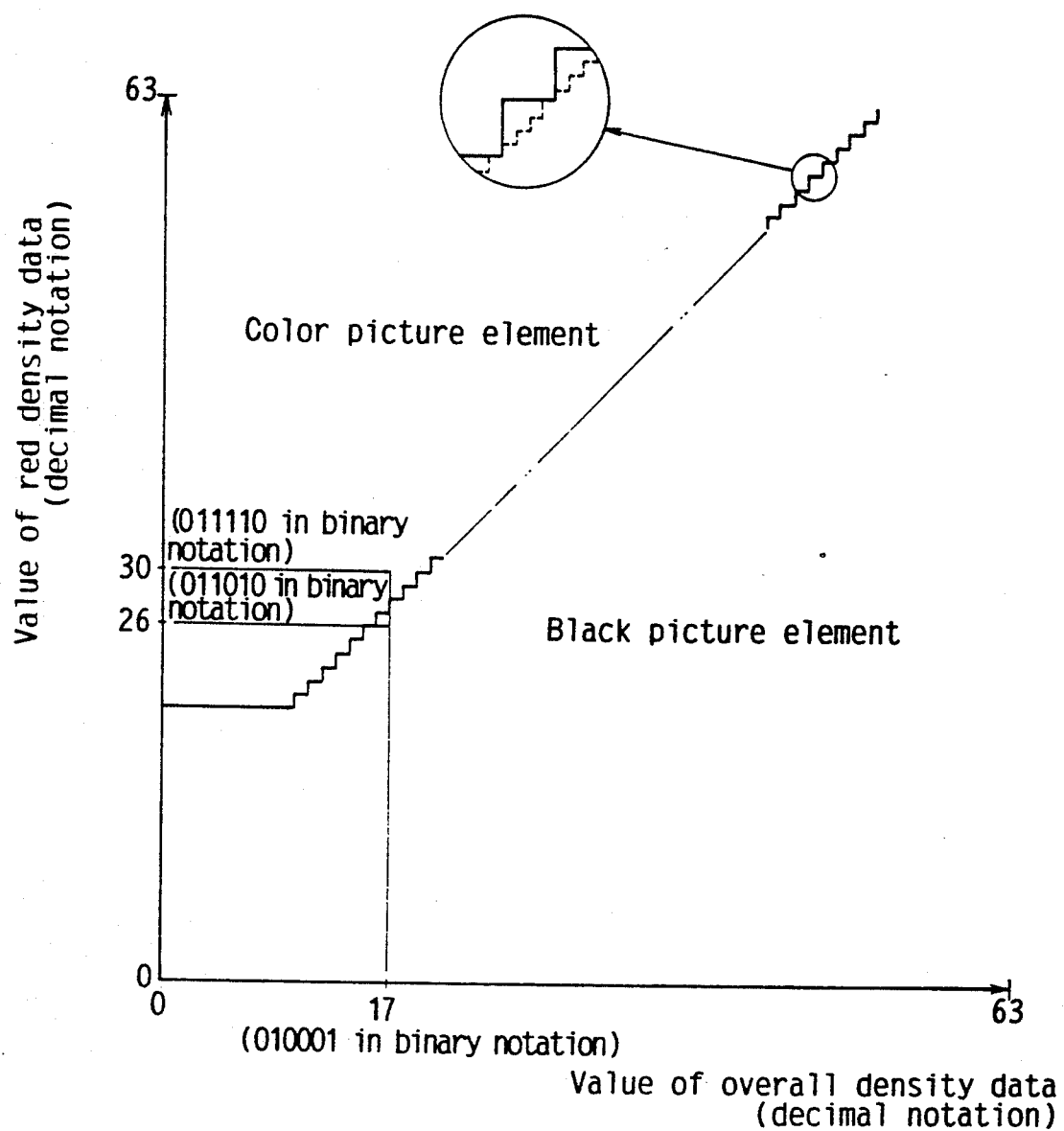

The color discriminating section 271 comprises, as shown in FIG. 17, a MAP-ROM 272 storing color discriminating maps shown in FIGS. 8a–8c and a selector 73.

In the above construction, the shading compensating sections 52 and 42 respectively compensate for shading of an 8-bit red density data and an 8-bit overall density data when the original image is being read.

Upper 6 bits of the 8-bit red density data outputted from the shading compensating section 52 are inputted into the delay memory 262 and outputted to the color discriminating section 271, being delayed a time corresponding to the image-forming time lag.

Into the MAP-ROM 272, are inputted as an address the 6-bit red density data outputted from the delay section 261 and a 6-bit overall density data consisting of upper 6 bits of the 8-bit overall density data outputted from the shading compensating section 42.

The color discriminating section 271 outputs a color discriminating data in accordance with the 6-bit red density data and the 6-bit overall density data.

For example, as shown in Table 4 below, when the 8-bit overall density data having a value of 01000110 is outputted from the shading compensating section 42, the 6-bit overall density data having a value of 010001 in the binary notation is inputted to the color discriminating section 271. When the 8-bit red density data outputted from the shading compensating section 52 has a value within a range of 01101010–01110011, the 6-bit red density data inputted to the color discriminating section 271 has a value within a range of 011010–011100, whereby the corresponding picture element is judged to be black. Similarly, when the 8-bit red density data has a value within a range of 01110100–01111010, the 6-bit red density data has a value within a range of 011101–011110, whereby the corresponding picture element is judged to be red.

TABLE 4

| Red density data | | Density data | | |
|---|---|---|---|---|
| Output of section 52 | Input to section 271 | Output of section 42 | Input to section 271 | Color Discrim. |
| 01101010 | 011010 | 01000110 | 010001 | black |
| 01101011 | | | | |
| 01101100 | 011011 | | | |
| 01101110 | | | | |
| 01101111 | | | | |
| 01110000 | 011100 | | | |
| 01110001 | | | | |
| 01110010 | | | | |
| 01110011 | | | | |
| 01110100 | 011101 | | | red |
| 01110101 | | | | |
| 01110110 | | | | |
| 01110111 | | | | |
| 01111000 | 011110 | | | |
| 01111001 | | | | |
| 01111010 | | | | |

That is, color discrimination is effected on the basis of the red density data and the overall density data, each having 64 gradations, while the 8-bit density data outputted from the image reading device has 256 gradations. In this case, as shown with a dotted line in FIG. 18a, color discrimination accuracy is a little lower than the case where the color is discriminated on the basis of the 8-bit red density data and the 8-bit overall density data, each having 256 gradations. However, this does not affect the image quality practically.

Since the 6-bit red density data is delayed by the delay section 261, the memory capacity of the delay memory 262 is reduced to ¾ of the case where the 8-bit red density data is delayed. Further, since the red density data and the overall density data inputted to the color discriminating section 271 each comprise 6 bits, the memory capacity of the MAP-ROM 272 is reduced to $1/16 = (2^6 \times 2^6)/(2^8 \times 2^8)$. In addition, other circuits can be compact and the number of lines can be reduced.

In this embodiment also, a dichroic prism may be lowered instead of the CCD line sensors as in the second embodiment. In this case, the delay memory can be dispensed with.

Further, the 8-bit red density data may be converted into the 6-bit red density data when the data is converted by the A/D converter, although shading compensation can be effected with higher accuracy if the 8-bit red density data is employed as in the above embodiment.

In the above three embodiments, two CCD line sensors are employed. It is of course possible to employ three or more line sensors, thereby detecting the density of another color component such as blue.

The overall density data may be obtained by providing a filter for each sensor and compounding a plurality of density data corresponding to all the color components. Or a density data of a specified color component may be used as the overall density data.

The density data of each color component may be detected with one sensor by repeating a scanning operation with the filter being changed. In this case, although a frame memory is necessary, its memory capacity may be reduced by lowering the picture element density or reducing the number of density level.

The CCD line sensors 32, 33, 102 and 103 may be close type line image sensors or flatbed image sensors.

The color discrimination by the color discriminating sections 71 and 271 may be done among three or more color components, for example, red, blue and black.

The picture element density of the red density data is lowered in the sub scanning direction in the first embodiment and in the main scanning direction in the second embodiment. It may be lowered in both directions. Further, both the picture element density and the number of density level may be reduced.

Although the present invention has been fully described by way of embodiments with references to the accompanying drawings, it is to be noted that various changes and modifications will be apparent to those skilled in the art. Therefore, unless such changes and modifications depart from the scope of the present invention, they should be construed as being included therein.

What is claimed is:

1. An image reading device for reading an image of an original document and outputting to an external device density data indicating a density of each picture element and color discriminating data indicating a color of each picture element, said image reading device comprising:

photoelectric transferring means for generating an electric signal corresponding to a density of the image of the original document;

first density data outputting means for outputting, in accordance with the signal generated by said photoelectric transferring means, a first density data indicating the density of the image and having a first picture element density;

second density data outputting means outputting, in accordance with the signal generated by said photoelectric transferring means, a second density data having a second picture element density which is lower than the first picture element density;

color discriminating means for outputting color discriminating data of the image on the basis of the second density data; and density data outputting means for outputting the density data of the image on the basis of the first density data.

2. An image reading device as claimed in claim 1, wherein the electric signal generated by said photoelectric transferring means includes two kinds of data which respectively signify the image density of different colors, and said second density data outputting means includes means for reducing picture element densities of both kinds of data included in the electric signal.

3. An image reading device as claimed in claim 1, wherein said photoelectric transferring means includes a first line image sensor having the first picture element density and a second line image sensor having the second picture element density.

4. An image reading device as claimed in claim 1, wherein said color discriminating means discriminates the color of the image on the basis of the first and second density data.

5. An image reading device as claimed in claim 1, wherein the first density data and second density data are respectively corresponding to different color images.

6. An image reading device as claimed in claim 1, further comprising means for producing third density data by converting the picture element density of the first density data, said color discriminating means discriminating the color of the image on the basis of the second density data and the third density data.

7. An image reading device as claimed in claim 1, wherein said second density data outputting means includes picture element density convert means for reducing the picture element density of the signal generated by said photoelectric transferring means so as to produce the second density data.

8. An image reading device as claimed in claim 7, further comprising:
magnification changing means for changing the picture element density of the first density data,
wherein said picture element density convert means changes the ratio at which the picture element density of the signal is reduced in accordance with the change of the picture element density of the first density data.

9. An image reading device as claimed in claim 1, wherein the second density data has a lower picture element density than the first density data in a sub scanning direction.

10. An image reading device as claimed in claim 1, wherein the second density data has a lower picture element density than the first density data in a main scanning direction.

11. An image reading device as claimed in claim 1, wherein the second density data has a lower picture element density than the first density data in both main and sub scanning directions.

12. An image reading device as claimed in claim 1, wherein said second density data outputting means includes means for reducing data of the signal by discarding a part of the data.

13. An image reading device as claimed in claim 1, wherein a value of the second density data is representative of a plurality of values signified by the signal from said photoelectric transferring means.

14. An image reading device as claimed in claim 1, wherein said color discriminating means includes a memory for storing data indicating the discrimination result of said color discriminating means in a memory area corresponding to the second density data.

15. An image reading device as claimed in claim 1, wherein said color discriminating means selectively makes one of multiple kinds of discriminations.

16. An image reading device as claimed in claim 1, wherein said photoelectric transferring means is a plurality of line image sensors arranged in parallel with one another at specified intervals.

17. An image reading device as claimed in claim 1, wherein said photoelectric transferring means includes a plurality of line image sensors and optical path dividing means for dividing light reflected on the original document into a plurality of light beams which are respectively guided to the plurality of line image sensors.

18. An image reading device as claimed in claim 1, further comprising:
outputting means for externally outputting the discrimination result of the color discriminating means and the first density data in synchronization with each other.

19. An image reading device for reading an image of an original document and outputting to an external device density data indicating a density of each picture element and color discriminating data indicating a color of each picture element, said image reading device comprising:
first photoelectric transferring means for generating a first electric signal corresponding to the density of an image of an original document having a first picture element density;
second photoelectric transferring means for generating a second electric signal corresponding to the density of the image of the original document and having a second picture element density lower than the first picture element density;
first density data outputting means for, in response to the first electric signal, outputting first density data indicating the density of the image;
second density data outputting means for, in response to the second electric signal, outputting second density data;
color discriminating means for outputting color discriminating data of the image on the basis of at least the second density data; and
density data outputting means for outputting the density data of the image on the basis of the first density data.

20. An image reading device as claimed in claim 19, wherein said second density data outputting means outputs the second density data in a lower picture element density than that of the first density data in a sub scanning direction.

21. An image reading device as claimed in claim 19, wherein said color discriminating means includes a memory for storing data indicating the discrimination result of said color discriminating means in a memory area corresponding to the second density data.

22. An image reading device as claimed in claim 19, wherein said color discriminating means selectively makes one of multiple kinds of discriminations.

23. An image reading device as claimed in claim 19, wherein said first and second photoelectric transferring means are first and second line image sensors arranged in parallel with each other at specified intervals.

24. An image reading device as claimed in claim 19, wherein said first and second photoelectric transferring means include first and second line image sensors and optical path dividing means for dividing light reflected on the original document into a plurality of light beams which are respectively guided to the first and second line image sensors.

25. An image reading device as claimed in claim 19, further comprising:
outputting means for externally outputting the discrimination result of the color discriminating means and the first density data in synchronization with each other.

26. An image reading device comprising:
photoelectric transferring means for generating an electric signal corresponding to a density of an image of an original document,
first density data outputting means for, in accordance with the electric signal generated by said photoelectric transferring means, outputting first density data indicating the density of the image and having a first number of density levels;
second density data outputting means for, in accordance with the electric signal generated by said photoelectric transferring means, outputting second density data having a second number of density levels fewer than the first number; and
color discriminating means for discriminating the color of the image on a basis of the second density data.

27. An image reading device as claimed in claim 26, wherein said color discriminating means includes a memory for storing data indicating the discrimination result of said color discriminating means in a memory area corresponding to the second density.

28. An image reading device as claimed in claim 26, wherein said color discriminating means selectively makes one of multiple kinds of discriminations.

29. An image reading device as claimed in claim 26, wherein said photoelectric transferring means is a plurality of line image sensors arranged in parallel with one another at specified intervals.

30. An image reading device as claimed in claim 26, wherein said photoelectric transferring means includes a plurality of line image sensors and optical path dividing means for dividing a light reflected on the original document into a plurality of light beams which are respectively guided to the plurality of line image sensors.

31. An image reading device as claimed in claim 26, further comprising:
outputting means for externally outputting the discrimination result of the color discriminating means and the first density data in synchronization with each other.

32. An image reading device as claimed in claim 26, wherein said second density data outputting means outputs the second density data in less number of bits than the first density data.

33. An image reading device as claimed in claim 26, wherein said first density data outputting means includes a first A/D converter for converting the electric signal into first digital data and said second density data outputting means includes a second A/D converter for converting the electric signal into second digital data having a less number of bits than the first digital data.

34. An image reading device as claimed in claim 26, wherein said second density data outputting means includes an A/D converter for converting the electric signal into digital data, modifying means for modifying the digital data and reducing means for reducing the number of bits of the modified digital data.

35. An image reading device as claimed in claim 34, wherein said modifying means is shading compensating means.

36. An image reading device for reading an image of an original document and outputting to an external device density data indicating a density of each picture element and color discriminating data indicating a color of each picture element, said image reading device comprising:
image reading means for reading the image with at least two color characteristics and outputting first image data used to generate the density data and second image data used to generate the color discriminating data, the second image data having a lower picture element density than the first image data;
color discriminating means for outputting the color discriminating data on a basis of the second image data; and
density data outputting means for outputting the density data of the image on a basis of first image data.

37. An image reading device as claimed in claim 36, further comprising at least two line image sensors, said image sensors including:
a first line image sensor for outputting the first image data; and
a second line image sensor for outputting the second image data, said second line image sensor having a lower detecting element density than the first line image sensor.

38. An image reading device for reading an image of an original document and outputting density data indicating a density of each picture element and color discriminating data indicating a color of each picture element, said image reading device comprising:
image reading means for reading the image with at least two color characteristics and outputting first image data used to generate the density data and second image data used to generate the color discriminating data, the second image data having a fewer number of density levels than the first image data; and
color discriminating means for outputting the color discriminating data on a basis of the second image data.

39. An image reading device for reading an image of an original document and outputting density data indicating a density of each picture element and color discriminating data indicating a color of each picture element, said image reading device comprising:
a plurality of line image sensors, arranged in parallel with one another at specified intervals, for reading the image with different color characteristics from one another and outputting first image data used to generate the density data and second image data used to generate the color discriminating data; and
delay means for delaying the second image data having a fewer number of density levels than the first image data; and
color discriminating means for outputting the color discriminating data on a basis of the second image data outputted from said delay means.

40. An image reading device for reading an image of an original document and outputting density data indicating density of each picture element and color discriminating data indicating a color of each picture element, said image reading device comprising:
image reading means for reading the image with at least two color characteristics and outputting first image data used to generate the density data and second image data used to generate the color discriminating data; and
. color discriminating means for outputting the color discriminating data on a basis of the second image data having a lower picture element density and a fewer number of density levels than the first image data.

* * * * *